US011202248B2

(12) United States Patent
Padaki et al.

(10) Patent No.: US 11,202,248 B2
(45) Date of Patent: Dec. 14, 2021

(54) APPARATUS AND METHOD FOR SPECIFYING RECEIVER ENABLE TIMES IN UWB COMMUNICATION AND RANGING SYSTEMS

(71) Applicant: Samsung Electronics Co., Ltd., Suwon-si (KR)

(72) Inventors: Aditya V. Padaki, Richardson, TX (US); Zheda Li, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 15/929,666

(22) Filed: May 14, 2020

(65) Prior Publication Data

US 2020/0374783 A1 Nov. 26, 2020

Related U.S. Application Data

(60) Provisional application No. 62/875,304, filed on Jul. 17, 2019, provisional application No. 62/874,289, (Continued)

(51) Int. Cl.
*H04W 4/00* (2018.01)
*H04W 48/16* (2009.01)
(Continued)

(52) U.S. Cl.
CPC ......... *H04W 48/16* (2013.01); *H04L 61/6022* (2013.01); *H04W 8/005* (2013.01); *H04W 80/02* (2013.01)

(58) Field of Classification Search
CPC ..... H04W 48/16; H04W 80/02; H04W 8/005; H04W 72/12; H04W 4/00; H04W 4/02;
(Continued)

(56) References Cited

U.S. PATENT DOCUMENTS 9,729,999 B2 * 8/2017 Wang .................... H04L 67/327
10,075,516 B2 * 9/2018 Qi ......................... H04L 67/104
(Continued)

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.
(Continued)

*Primary Examiner* — Marceau Milord

(57) ABSTRACT

A method and apparatus of a network entity in a wireless communication system supporting ranging capability is provided. The method and apparatus comprises: identifying a MAC sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer; in response to identifying the MLME-RX-ENABLE.request primitive, identifying a value of a MAC RSTU_COUNTER; determining whether the value of the MAC RSTU_COUNTER is set to an RxOnTime value included in the list of the RxOnTime values of the MLME-RX-ENABLE.request primitive; increasing the value of the MAC RSTU_COUNTER; determining whether a frame is received from another network entity based on the value of the MAC RSTU_COUNTER; and in response to determining that the frame is received, generating a MAC common part sublayer indication (MCPS-DATA.indication) primitive.

20 Claims, 15 Drawing Sheets

Related U.S. Application Data filed on Jul. 15, 2019, provisional application No. 62/865,515, filed on Jun. 24, 2019, provisional application No. 62/850,852, filed on May 21, 2019.

(51) Int. Cl.
   H04L 29/12   (2006.01)
   H04W 80/02   (2009.01)
   H04W 8/00    (2009.01)

(58) Field of Classification Search
   CPC ..... H04W 80/00; H04W 72/04; H04W 84/18; H04W 4/80; H04L 61/6022; H04L 29/08
   USPC .................... 370/329, 328, 331, 338, 395.21
   See application file for complete search history.

(56) References Cited

U.S. PATENT DOCUMENTS

| | | | | |
|---|---|---|---|---|
| 10,225,710 | B2* | 3/2019 | Wang | H04W 4/70 |
| 10,908,274 | B2* | 2/2021 | Li | H04W 72/048 |
| 2008/0108303 | A1* | 5/2008 | Okuda | H04W 84/047 455/7 |
| 2008/0291855 | A1* | 11/2008 | Bata | H04W 84/18 370/311 |
| 2009/0296661 | A1* | 12/2009 | Lee | H04W 64/00 370/335 |
| 2010/0061307 | A1* | 3/2010 | Lim | H04W 48/16 370/328 |
| 2011/0034195 | A1* | 2/2011 | Lee | H04W 56/0005 455/509 |
| 2013/0272265 | A1* | 10/2013 | Jung | H04W 36/0077 370/331 |
| 2017/0041926 | A1* | 2/2017 | Qi | G01S 13/74 |
| 2017/0127297 | A1* | 5/2017 | Stanescu | H04L 1/1671 |
| 2017/0339512 | A1* | 11/2017 | Wang | H04L 67/327 |
| 2019/0020744 | A1* | 1/2019 | Dong | H04B 10/1149 |
| 2019/0116223 | A1 | 4/2019 | Qi et al. | |
| 2020/0137676 | A1* | 4/2020 | Yoon | H04W 4/70 |
| 2020/0182996 | A1* | 6/2020 | Lee | H04B 1/7163 |
| 2020/0183000 | A1* | 6/2020 | Li | G01S 13/878 |
| 2020/0200862 | A1* | 6/2020 | Li | G01S 5/0226 |
| 2020/0213842 | A1* | 7/2020 | Li | H04W 12/55 |
| 2020/0225341 | A1* | 7/2020 | Li | H04L 5/0055 |

OTHER PUBLICATIONS

"IEEE Standard for Information technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (WPANs); Amendment 1: Add Alternate PHYs", IEEE Std 802.15.4a™-2007, Aug. 2007, 203 pages.

"IEEE Standard for Low-Rate Wireless Networks", IEEE Computer Society, IEEE Std 802.15.4TM, Dec. 2015, 708 pages.

"IEEE 802.15.4z MAC", IEEE P802.15 Working Group for Wireless Personal Area Networks (WPANs), Dec. 2018, 51 pages.

International Search Report and Written Opinion of the International Searching Authority in connection with International Application No. PCT/KR2020/006593 dated Aug. 31, 2020, 10 pages.

Lee et al., "IEEE 802.15.4z MAC," IEEE P802.15 Working Group for Wireless Personal Area Networks (WPANs), IEEE P802.15-19-0034-00-004z, Dec. 2018, 50 pages.

Verso, "Ranging procedures and messages," IEEE P802.15 Working Group for Wireless Personal Area Networks (WPANs), IEEE P802.15-18-0599-00-004Z, Nov. 2018, 25 pages.

IEEE Standards Association, "IEEE Standards for Local and metropolitan area networks—Part 15.4: Low-Rate Wireless Personal Area Networks (LR_WPANS)," IEEE Std. 802.15.4TM-2011, Sep. 5, 2011, 313 pages.

* cited by examiner

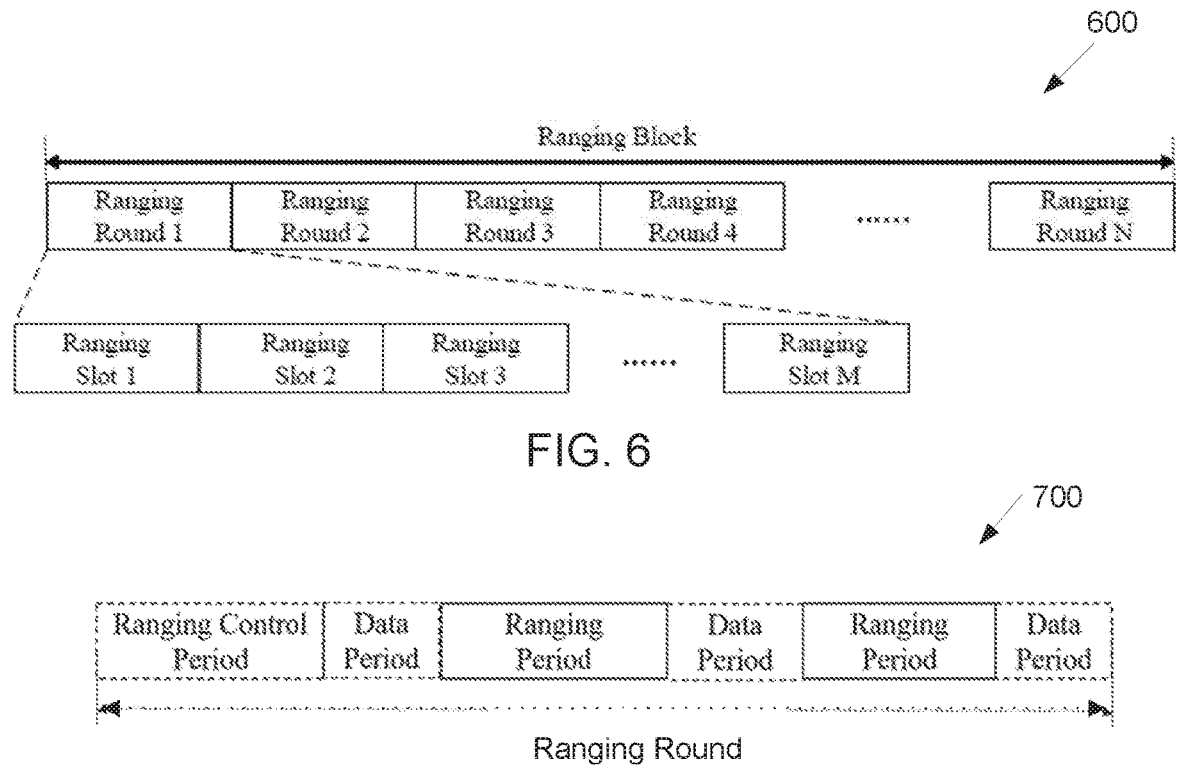
FIG. 6
FIG. 7
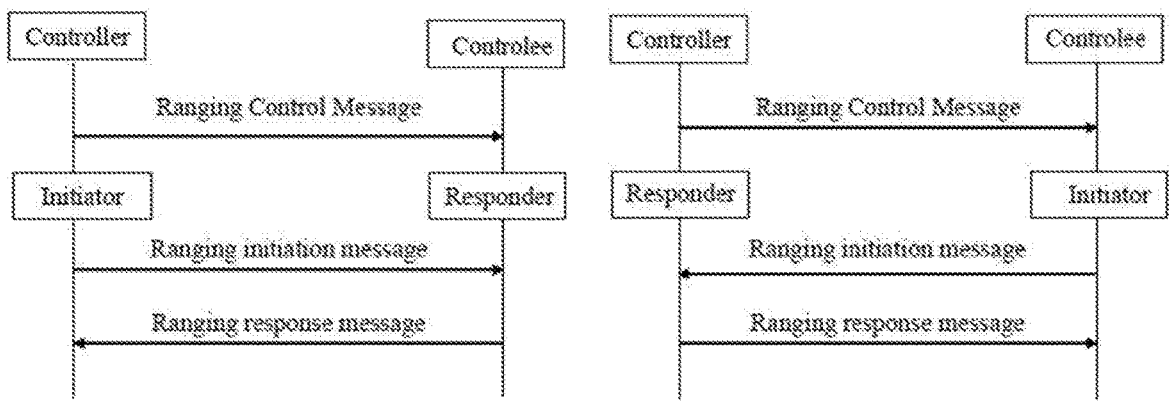
FIG. 8

| Bits: 2 | 4 | 1 | 1 | 1 | 6 | 6 | Octets: 2 | 2 | 1 |
|---|---|---|---|---|---|---|---|---|---|
| Cast Mode | Ranging Mode | Schedule Mode | Deferred Mode | Time Structure Indicator | Block Length Multiplier | Number of Active Ranging Rounds | Minimum Block Length | Ranging Round Length | Ranging Slot Length |

FIG. 9

| Bits: 2 | 2 | 2 | 1 | 1 | 1 | 6 | 6 | 3 | Octets: 2 | 2 | 1 |
|---|---|---|---|---|---|---|---|---|---|---|---|
| Multi-node Mode | Ranging Method | STS Packet Config | Schedule Mode | Deferred Mode | Time Structure Indicator | Block Length Multiplier | Number of Active Ranging Rounds | Reserved | Minimum Block Duration | Ranging Round Length | Ranging Slot Length |

FIG. 10

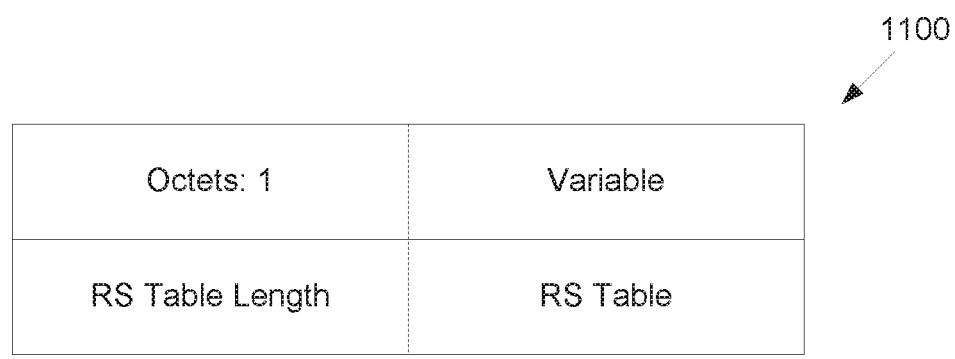
FIG. 11
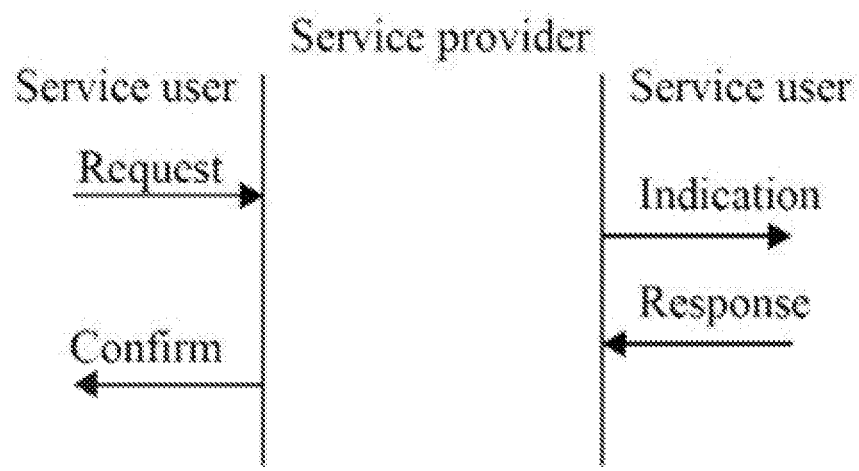
FIG. 12
FIG. 13

APPARATUS AND METHOD FOR SPECIFYING RECEIVER ENABLE TIMES IN UWB COMMUNICATION AND RANGING SYSTEMS

CROSS-REFERENCE TO RELATED APPLICATIONS AND CLAIM OF PRIORITY

The present application claims priority to:
U.S. Provisional Patent Application No. 62/850,852 filed on May 21, 2019;
U.S. Provisional Patent Application No. 62/865,515 filed on Jun. 24, 2019;
U.S. Provisional Patent Application No. 62/874,289 filed on Jul. 15, 2019; and
U.S. Provisional Patent Application No. 62/875,304 filed on Jul. 17, 2019. The content of the above-identified patent documents is incorporated herein by reference.

TECHNICAL FIELD

The present disclosure relates generally to frameworks and methods for specifying receiver enable times in UWB communication and ranging systems.

BACKGROUND

A peer aware communication (PAC) network is a fully distributed communication network that allows direct communication among the PAC devices (PDs). A PAC device is an electronic device that has communication capability. Additionally, The PAC device can also have ranging capability. The PAC device may be referred to as a ranging device (RDEV), or an enhanced ranging device (ERDEV), or a secure ranging device (SRDEV) or any other similar name. RDEV, ERDEV, or SRDEV can be a part of an access point (AP), a station (STA), an eNB, a gNB, a UE, or any other communication node with ranging capability as defined in IEEE standard specification. PAC networks may employ several topologies like mesh, star, etc. to support interactions among the PDs for various services.

SUMMARY

Embodiments of the present disclosure provide frameworks and methods for specifying receiver enable times in UWB communication and ranging systems.

In one embodiment, a network entity in a wireless communication system supporting ranging capability is provided. The network entity comprises a transceiver. The network entity further comprises a processor operably connected to the transceiver, the processor configured to: identify a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer; in response to identifying the MLME-RX-ENABLE.request primitive, identify a value of a MAC RSTU_counter (MAC RSTU_COUNTER); determine whether the value of the MAC RSTU_COUNTER is set to an RxOnTime value included in the list of the RxOnTime values of the MLME-RX-ENABLE.request primitive; increase the value of the MAC RSTU_COUNTER; determine whether the transceiver receives, from another network entity, a frame based on the value of the MAC RSTU_COUNTER; and in response to determining that the transceiver receives the frame, generate a MAC common part sublayer indication (MCPS-DATA.indication) primitive.

In another embodiment, a method of a network entity in a wireless communication system supporting ranging capability is provided. The method comprises: identifying a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer; in response to identifying the MLME-RX-ENABLE.request primitive, identifying a value of a MAC RSTU counter (MAC RSTU_COUNTER); determining whether the value of the MAC RSTU_COUNTER is set to an RxOnTime value included in the list of the RxOnTime values of the MLME-RX-ENABLE.request primitive; increasing the value of the MAC RSTU_COUNTER; determining whether a frame is received from another network entity based on the value of the MAC RSTU_COUNTER; and in response to determining that the frame is received, generating a MAC common part sublayer indication (MCPS-DATA.indication) primitive.

In yet another embodiment, a non-transitory computer-readable medium comprising program code, that when executed by at least one processor, causes a network entity to in a wireless communication system supporting ranging capability is provided. The non-transitory computer-readable medium causes the network entity to configure to: identify a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer; in response to identifying the MLME-RX-ENABLE.request primitive, identify a value of a MAC RSTU counter (MAC RSTU_COUNTER); determine whether the value of the MAC RSTU_COUNTER is set to an RxOnTime value included in the list of the RxOnTime values of the MLME-RX-ENABLE.request primitive; increase the value of the MAC RSTU_COUNTER; determine whether a transceiver receives, from another network entity, a frame based on the value of the MAC RSTU_COUNTER; and in response to determining that the transceiver receives the frame, generate a MAC common part sublayer indication (MCPS-DATA.indication) primitive.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "ranging," as well as derivatives thereof, mean that the fundamental measurements for ranging between devices are achieved by a transmission and a reception of one or more messages. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example ranging configuration according to embodiments of the present disclosure;

FIG. 7 illustrates an example general ranging round structure according to embodiments of the present disclosure;

FIG. 8 illustrates an example ranging controller, controlee, initiator, responder according to embodiments of the present disclosure;

FIG. 9 illustrates an example advanced ranging control IE as defined in 802.15.4z according to embodiments of the present disclosure;

FIG. 10 illustrates an example advanced ranging control IE Content field format as defined in 802.15.4z according to embodiments of the present disclosure;

FIG. 11 illustrates an example ranging scheduling IE according to embodiments of the present disclosure;

FIG. 12 illustrates an example row of ranging scheduling table according to embodiments of the present disclosure;

FIG. 13 illustrates example service primitives according to embodiments of the present disclosure;

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; IEEE Standard Wireless Medium Access Control (MAC) and Physical Layer (PHY) Specifications for Low Rate Wireless Personal Area Networks (WPANs), Amendment 1: Add Alternative PHYs, IEEE Std 802.15.4a (2007); IEEE Standard for Low-Rate Wireless Networks, IEEE Std 802.15.4 (2015); and IEEE 802.15.4z MAC.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
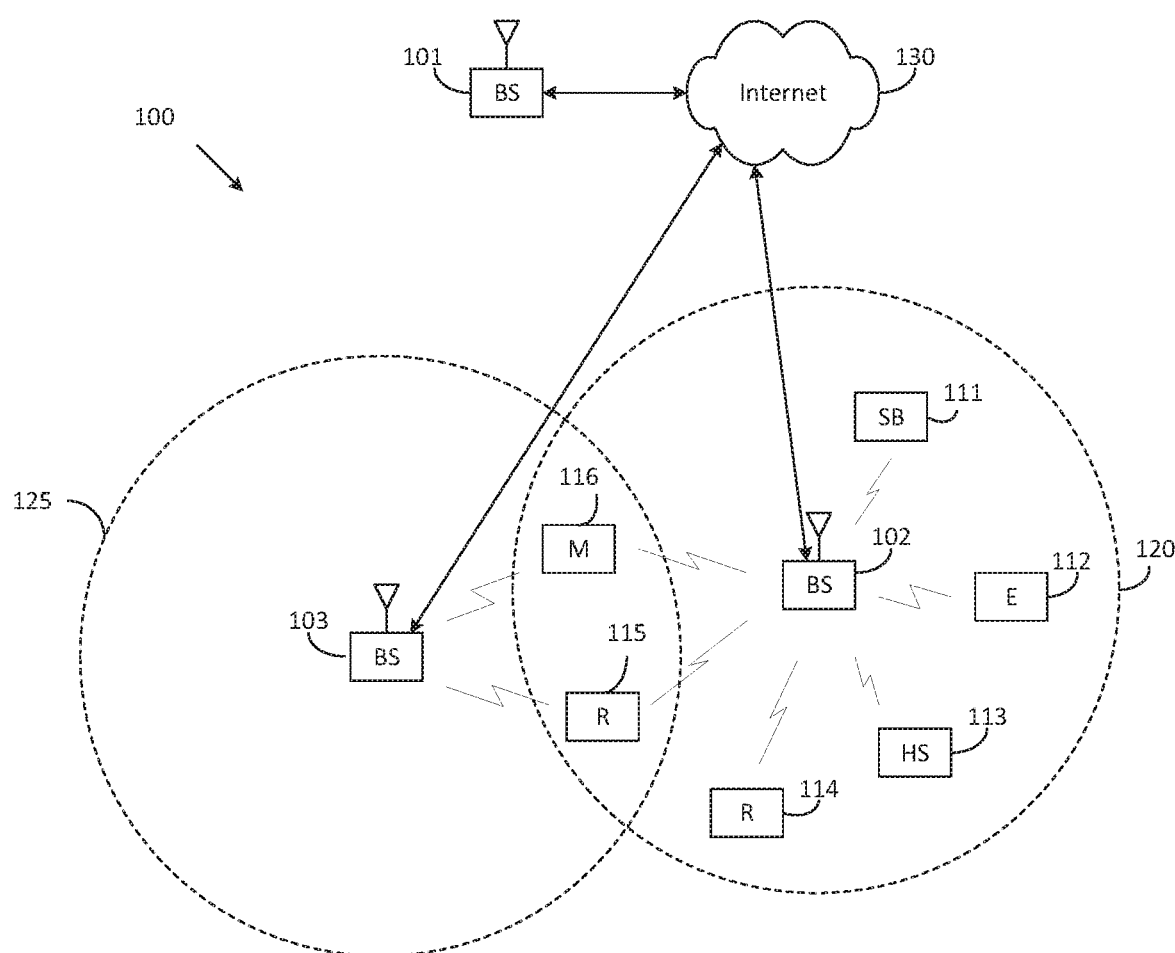
FIG. 1 illustrates an example wireless network according to embodiments of the present disclosure.
Figure 2:
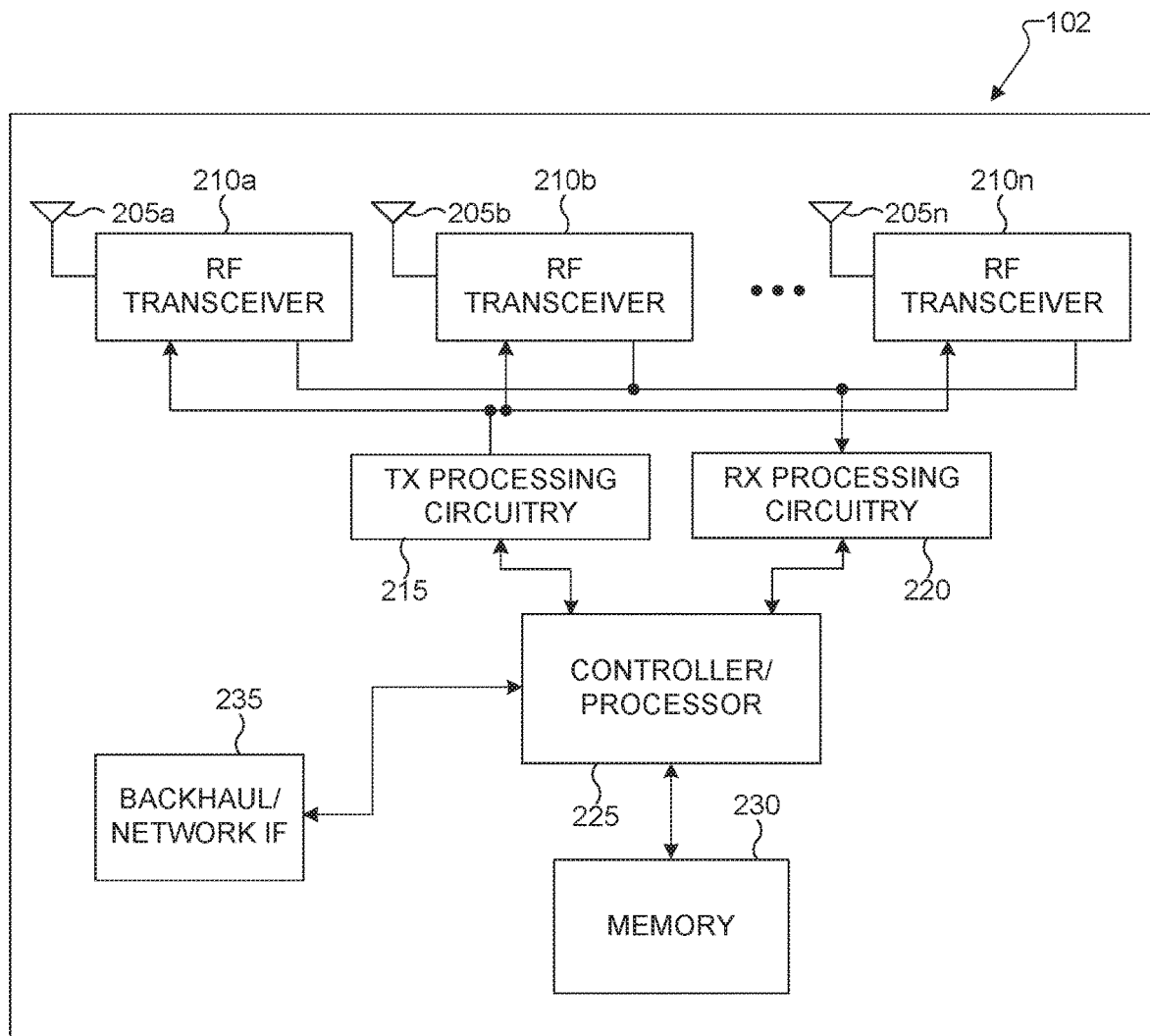
FIG. 2 illustrates an example gNB according to embodiments of the present disclosure.
Figure 3:
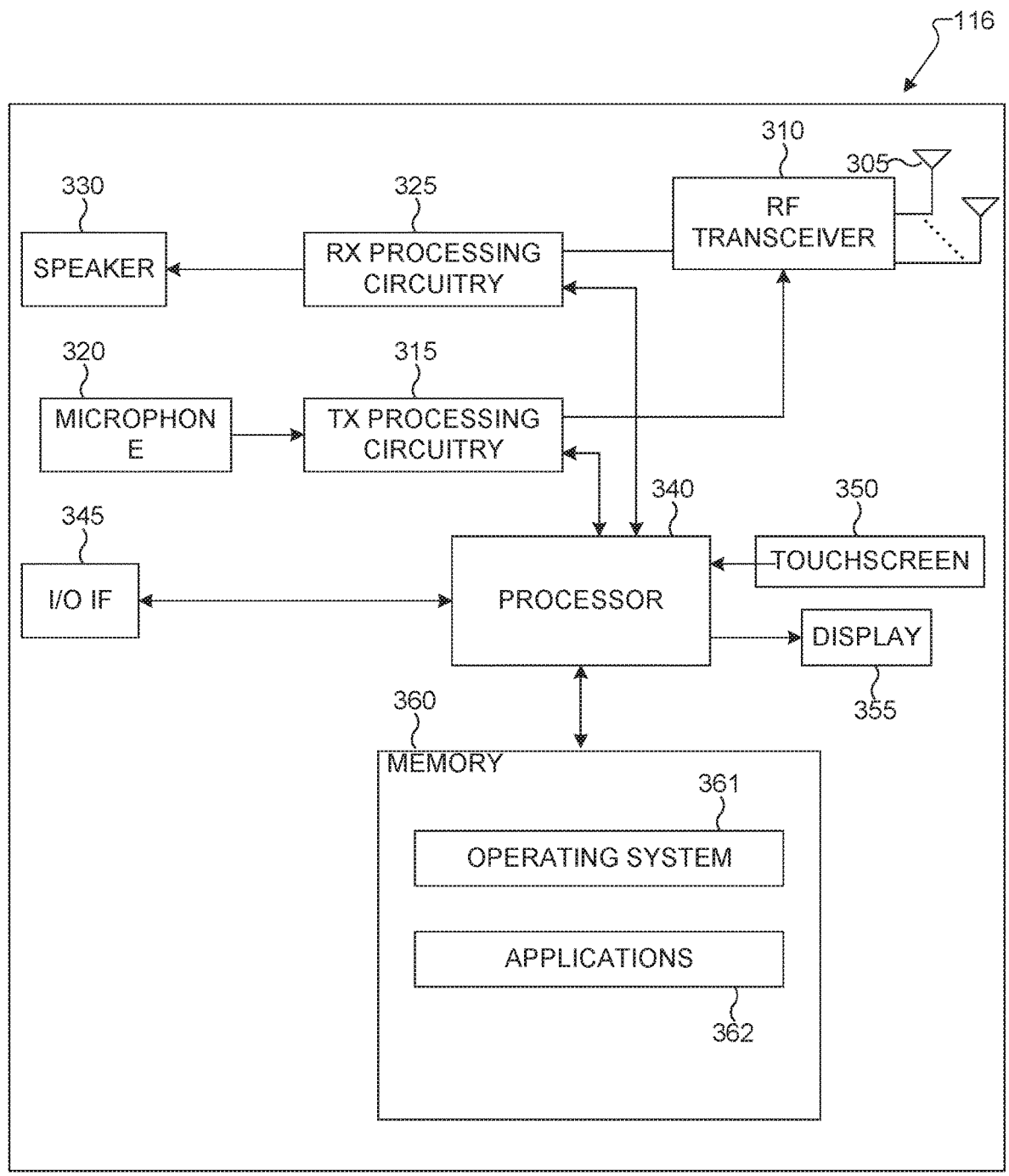
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for utilizing a framework for specifying receiver enable times in UWB communication and ranging systems. In certain embodiments, and one or more of the gNBs 101-103 includes circuitry, programming, or a combination thereof, for utilizing a framework for specifying receiver enable times in UWB communication and ranging systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX)

processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
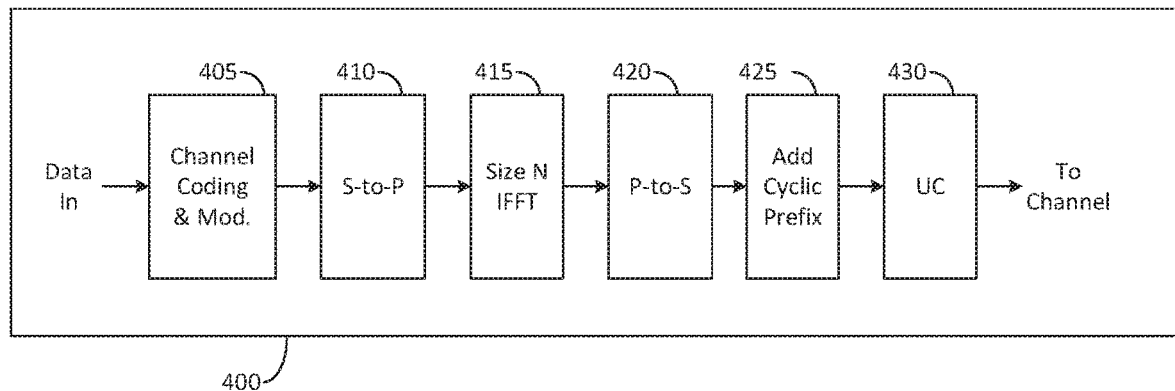
FIG. 4A illustrates a high-level diagram of an orthogonal frequency division multiple access transmit path according to embodiments of the present disclosure.
Figure 4B:
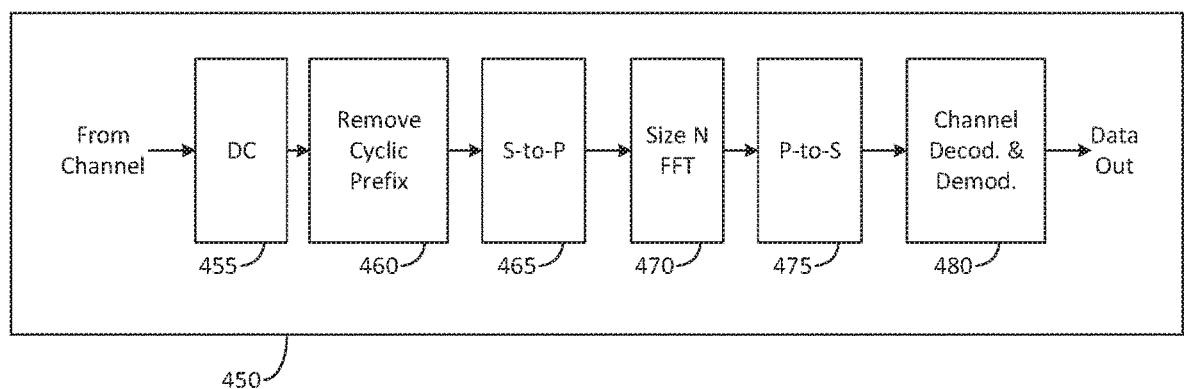
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). A wireless personal area network (WPAN) or simply a personal area network (PAN) may be a fully distributed communication network. A WPAN or PAN is communication network that allows wireless connectivity among the PAN devices (PDs). PAN devices and PAC devices may be interchangeably used as PAC network is also a PAN network and vice versa.

PAC networks may employ several topologies like mesh, star, and/or peer-to-peer, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
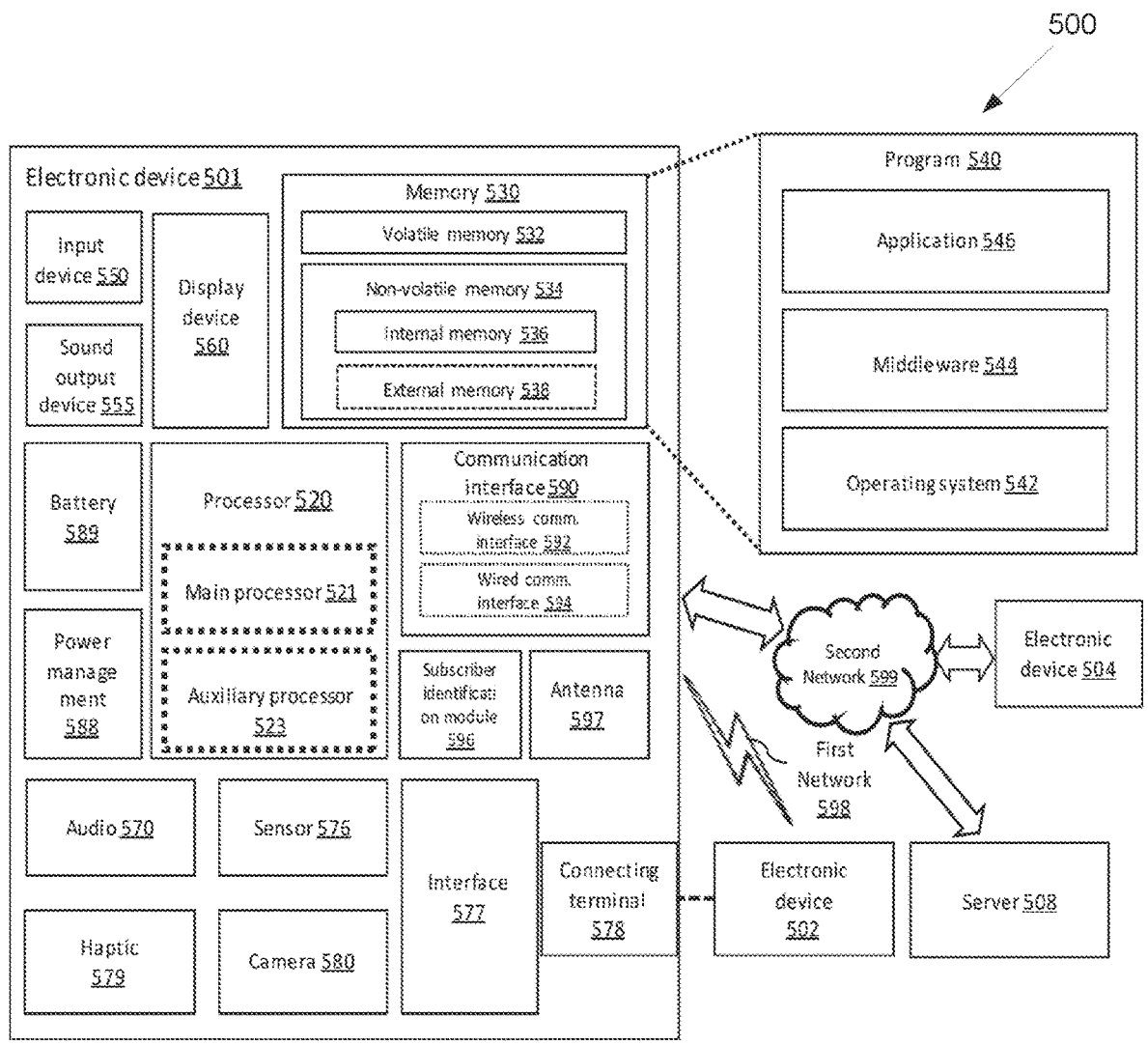
FIG. 5 illustrates an example electronic device according to embodiments of the present disclosure.

FIG. 5 illustrates an example electronic device 501 according to embodiments of the present disclosure. The embodiment of the electronic device 501 illustrated in FIG. 5 is for illustration only. FIG. 5 does not limit the scope of the present disclosure to any particular implementation.

PDs can be an electronic device that may have communication and ranging capability. The electronics device may be referred to as a ranging device (RDEV), or an enhanced ranging device (ERDEV), or a secure ranging device (SRDEV) or any other similar name in accordance with the IEEE standard specification. RDEV, ERDEV, or SRDEV can be a part of an access point (AP), a station (STA), an eNB, a gNB, a UE, or any other communication node with ranging capability.

Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by other components (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A ranging block is a time period for ranging. Each ranging block includes an integer multiple of ranging rounds, where a ranging round is the time period to complete of one entire range-measuring cycle involving the set of RDEV participating in the ranging measuring. Each ranging round is further subdivided into an integer number of ranging slots, where a ranging slot is a period of time of sufficient length for the transmission of at least one RFRAME.

FIG. 6 illustrates an example ranging configuration 600 according to embodiments of the present disclosure. The embodiment of the ranging configuration 600 illustrated in FIG. 6 is for illustration only. FIG. 6 does not limit the scope of the present disclosure to any particular implementation. In one embodiment, the ranging configuration 600 may be used by a controller, a controlee, an initiator, and/or responder as illustrated in FIG. 8. In one embodiment, the ranging configuration 600 may be used by a network entity (e.g., BS 101-103 as illustrated in FIG. 1, terminal 111-116 as illustrated in FIG. 1).

FIG. 6 shows the ranging block Structure, with the ranging block divided into N ranging rounds, each consisting of M ranging slots.

The general ranging round structure includes a ranging control period in which a ranging control message is transmitted to configure the ranging rounds. It is followed by one or more ranging periods and data periods. These data periods usually include transmission of ranging related data using certain information elements (IE) defined within the standard. The most generic ranging round structure is as shown in FIG. 7.

FIG. 7 illustrates an example general ranging round structure 700 according to embodiments of the present disclosure. The embodiment of the general ranging round structure 700 illustrated in FIG. 7 is for illustration only. FIG. 7 does not limit the scope of the present disclosure to any particular implementation. In one embodiment, the general ranging round structure 700 may be used by a controller, a controlee, an initiator, and/or responder as illustrated in FIG. 8. In one embodiment, the general ranging round structure 700 may be used by a network entity (e.g., BS 101-103 as illustrated in FIG. 1, terminal 111-116 as illustrated in FIG. 1).

In the present disclosure, following nomenclature is used: controller: a ranging device that defines and controls the ranging parameters by sending ranging control message in ranging control period; controlee: a Ranging device that utilizes the ranging parameters received from the controller; initiator: a ranging device that initiates a ranging exchange by sending the first message of the exchange or the device that send ranging ancillary data (in payload)/data; and responder: a ranging device that receives ranging ancillary data (in payload)/data and/or responds to the message received from the initiator.

FIG. 8 illustrates an example ranging controller, controlee, initiator, and responder 800 according to embodiments of the present disclosure. The embodiment of the ranging controller, controlee, initiator, and responder 800 illustrated in FIG. 8 is for illustration only. FIG. 8 does not limit the scope of the present disclosure to any particular implementation.

A relevant IE for this is the advanced ranging control IE as shown in that is usually transmitted during the ranging control period. The advanced ranging control IE (ARC IE) is used by a controller to send the ranging configuration 22 information to a controlee (in a unicast frame) or multiple controlees (in multicast/broadcast frame). The content field of the ARC IE maybe formatted as shown in FIG. 9.

FIG. 9 illustrates an example advanced ranging control IE as defined in 802.15.4z 900 according to embodiments of the present disclosure. The embodiment of the advanced ranging control IE as defined in 802.15.4z 900 illustrated in FIG. 9 is for illustration only. FIG. 9 does not limit the scope of the present disclosure to any particular implementation. In one embodiment, the advanced ranging control IE as defined in 802.15.4z 900 may be used by a controller, a controlee, an initiator, and/or responder as illustrated in FIG. 8. In one embodiment, the advanced ranging control IE as defined in 802.15.4z 900 may be used by a network entity (e.g., BS 101-103 as illustrated in FIG. 1, terminal 111-116 as illustrated in FIG. 1).

Ranging mode values are shown in TABLE 1. Other details of the ARC IE can be found in the IEEE standard specification.

TABLE 1

Ranging mode value

| Ranging Mode value | Ranging frame type and the ranging method |
|---|---|
| 0 | Non-secure OWR |
| 1 | non-secure SS-TWR |
| 2 | non-secure DS-TWR |
| 4 | secure OWR with payload |
| 5 | secure SS-TWR with payload |
| 6 | secure DS-TWR with payload |
| 7 | secure OWR without payload |
| 8 | secure SS-TWR without payload |
| 9 | secure DS-TWR without payload |

Alternative structure of the advanced ranging control IE in 802.15.4z based on revisions is as shown in FIG. 10.

FIG. 10 illustrates an example advanced ranging control IE content field format as defined in 802.15.4z 1000 according to embodiments of the present disclosure. The embodiment of the advanced ranging control IE content field format as defined in 802.15.4z 1000 illustrated in FIG. 10 is for illustration only. FIG. 10 does not limit the scope of the present disclosure to any particular implementation. In one embodiment, the advanced ranging control IE content field format as defined in 802.15.4z 1000 may be used by a controller, a controlee, an initiator, and/or responder as illustrated in FIG. 8. In one embodiment, the advanced ranging control IE content field format as defined in 802.15.4z 1000 may be used by a network entity (e.g., BS 101-103 as illustrated in FIG. 1, terminal 111-116 as illustrated in FIG. 1).

For the scheduling-based ranging with multiple devices, the ranging scheduling (RS) IE can be used to convey the resource assignment, which includes the field of RS table and RS table length as illustrated in FIG. 11. The field of RS table length indicates the number of rows in the RS table.

FIG. 11 illustrates an example ranging scheduling IE 1100 according to embodiments of the present disclosure. The embodiment of the ranging scheduling IE 1100 illustrated in FIG. 11 is for illustration only. FIG. 11 does not limit the scope of the present disclosure to any particular implementation. In one embodiment, the ranging scheduling IE 1100 may be used by a controller, a controlee, an initiator, and/or responder as illustrated in FIG. 8. In one embodiment, the ranging scheduling IE 1100 may be used by a network entity (e.g., BS 101-103 as illustrated in FIG. 1, terminal 111-116 as illustrated in FIG. 1).

FIG. 12 illustrates an example row of ranging scheduling table 1200 according to embodiments of the present disclosure. The embodiment of the row of ranging scheduling table 1200 illustrated in FIG. 12 is for illustration only. FIG. 12 does not limit the scope of the present disclosure to any particular implementation. In one embodiment, the row of ranging scheduling table 1200 may be used by a controller, a controlee, an initiator, and/or responder as illustrated in FIG. 8. In one embodiment, the row of ranging scheduling table 1200 may be used by a network entity (e.g., BS 101-103 as illustrated in FIG. 1, terminal 111-116 as illustrated in FIG. 1).

Each row of The RS table includes a slot index field for a time slot, an address field of the device assigned to this slot, and a device type field to indicate the role of the assigned device as illustrated in FIG. 12. Depending on device capability and vendor specification, different types of address can be used. If a device type for a specific address is 0, the device is a responder. Otherwise, the device is an initiator.

FIG. 13 illustrates example service primitives 1300 according to embodiments of the present disclosure. The embodiment of the service primitives 1300 illustrated in FIG. 13 is for illustration only. FIG. 13 does not limit the scope of the present disclosure to any particular implementation. In one embodiment, the service primitives 1300 may be used by a controller, a controlee, an initiator, and/or responder as illustrated in FIG. 8. In one embodiment, the service primitives 1300 may be used by a network entity (e.g., BS 101-103 as illustrated in FIG. 1, terminal 111-116 as illustrated in FIG. 1).

The services of a layer are the capabilities the layer offers to the user in the next higher layer or sublayer by building the layer' functions on the services of the next lower layer. This concept is illustrated in FIG. 13, showing the service hierarchy and the relationship of the two correspondent users and their associated layer (or sublayer) peer protocol entities.

The services are specified by describing the information flow between the N-user and the N-layer. This information flow is modeled by discrete, instantaneous events, which characterize the provision of a service. Each event consists of passing a service primitive from one layer to the other through a layer service access point (SAP) associated with an N-user. Service primitives convey the required information by providing a particular service. These service primitives are an abstraction because These service primitives specify only the provided service rather than the means by which the service is provided. This definition is independent of any other interface implementation. A service is specified by describing the service primitives and parameters that characterize it.

A primitive can be one of four generic types: (1) Request: the request primitive is used to request that a service is initiated; (2) Indication: the indication primitive is used to indicate to the user an internal event; (3) Response: the response primitive is used to complete a procedure previously invoked by an indication primitive; and (4) Confirm: the confirm primitive is used to convey the results of one or more associated previous service requests.

The MAC sublayer provides an interface between the next higher layer and the PHY. The MAC sublayer conceptually includes a management entity called the MLME. This entity provides the service interfaces through which layer management may be invoked. The MLME is also responsible for maintaining a database of managed objects pertaining to the MAC sublayer. This database is referred to as the MAC sublayer PIB.

Figure 14:
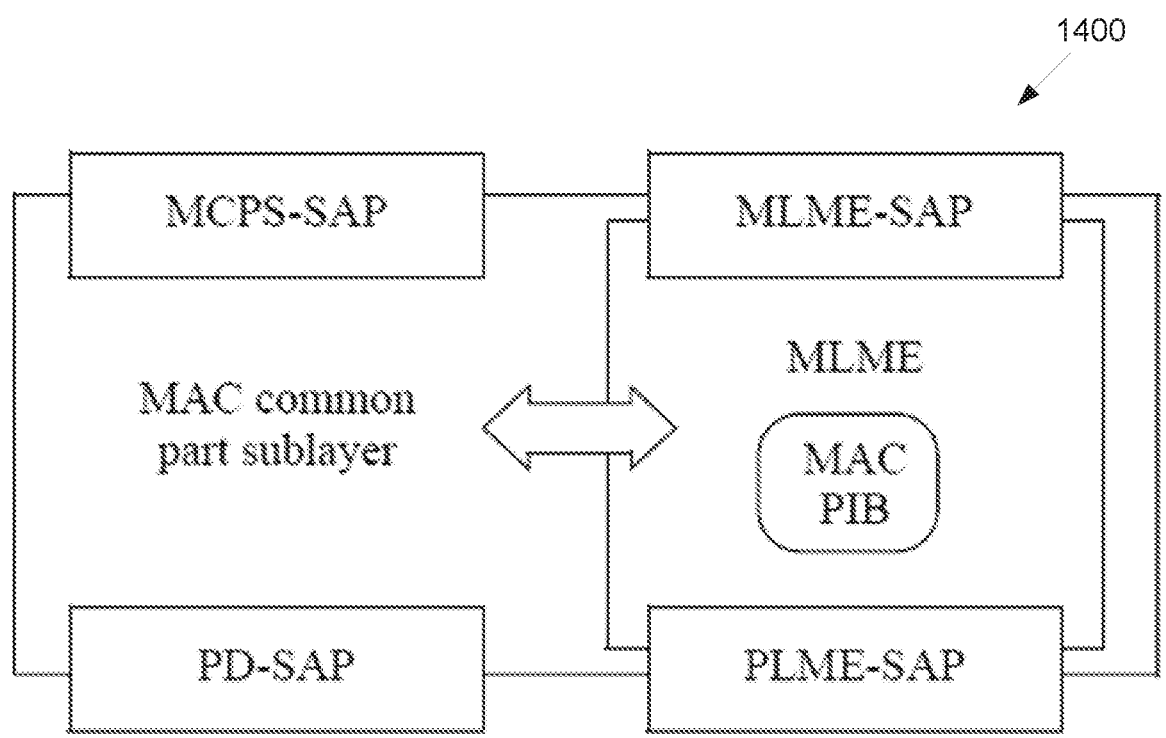
FIG. 14 illustrates an example MAC Sublayer reference model according to embodiments of the present disclosure.

FIG. 14 illustrates an example MAC sublayer reference model 1400 according to embodiments of the present disclosure. The embodiment of the MAC sublayer reference model 1400 illustrated in FIG. 14 is for illustration only. FIG. 14 does not limit the scope of the present disclosure to any particular implementation. In one embodiment, the MAC sublayer reference model 1400 may be used by a controller, a controlee, an initiator, and/or responder as illustrated in FIG. 8. In one embodiment, the MAC sublayer reference model 1400 may be used by a network entity (e.g., BS 101-103 as illustrated in FIG. 1, terminal 111-116 as illustrated in FIG. 1).

The MAC sublayer provides two services, accessed through two SAPs: (1) the MAC data service, accessed through the MAC common part sublayer (MCPS) data SAP (MCPS-SAP); and (2) the MAC management service, accessed through the MAC layer management entity SAP (MLME-SAP).

These two services provide the interface between the next higher layer and the PHY. In addition to these external interfaces, an implicit interface also exists between the MLME and the MCPS that allows the MLME to use the MAC data service.

The MLME-RX-ENABLE.request primitive allows the next higher layer to request that the receiver is either enabled for a finite period of time or disabled. The receiver is enabled or disabled exactly once per primitive request. The MLME-RX-ENABLE.confirm primitive reports the results of the attempt to enable or disable the receiver.

In one embodiment, primitives for specifying the receiver enable time are provided.

These primitives are used to enable or disable a device's receiver at a given time. In such embodiment, schemes to enable or disable the receiver multiple times through a single primitive request are provided. While the description here follows the duration of a ranging round duration, it does not preclude other durations like superframe duration, frame duration, beacon interval, inter frame duration, etc.

In one example S1, MLME-RANGING-ROUND-RX-ENABLE.request by specifying receiver ON times and durations is provided.

The next higher layer can request that the receiver is either enabled for a finite period of time or disabled multiple times in a ranging round through a single primitive request using MLME-RANGING-ROUND-RX-ENABLE.request.

The semantics of this primitive are as follows:

```
MLME-RANGING-ROUND-RX-ENABLE.request (
    DeferPermit,
    RxOnTimes,
    RxOnDurations,
    RangingRxControl
).
```

The primitive parameters are defined in TABLE 2.

The MLME-RANGING-ROUND-RX-ENABLE.request primitive is generated by the next higher layer and issued to the MLME to enable the receiver for fixed durations, at times relative to the start of the current or next ranging round. This primitive may also be generated to cancel a previously generated request to enable the receiver. The receiver is enabled based on the times in the unit of RSTU specified by the list of integers in RxOnTimes and disabled after the corresponding duration chronologically specified by the list of integers in RxOnDurations. The length of the list of integers specified in RxOnTimes and RxOnDurations may be the same.

The MLME may treat the request to enable or disable the receiver as secondary to other responsibilities of the device (e.g., GTSs, coordinator beacon tracking, or beacon transmissions). When the primitive is issued to enable the receiver, the device may enable the device's receiver until either the device has a conflicting responsibility, or the time specified by RxOnDuration has expired. In the case of a conflicting responsibility, the device may interrupt the receive operation. After the completion of the interrupting operation, the RxOnDuration may be checked to determine whether the time has expired. If so, the operation is complete. If not, the receiver is re-enabled until either the device has another conflicting responsibility, or the time specified by RxOnDuration has expired. When the primitive is issued to disable the receiver, the device may disable the device' receiver unless the device has a conflicting responsibility.

Before attempting to enable the receiver, the MLME first determines whether each of the corresponding (RxOnTimes+RxOnDurations) is less than the number of RSTUs spanning the ranging round duration, as defined by the previous ranging control message. If those of the corresponding (RxOnTimes+RxOnDurations) is not less than the ranging round duration, the MLME issues the MLME-RXENABLE.confirm primitive with a Status of ON_TIME_TOO_LONG.

TABLE 2

MLME-RX-ENABLE.request parameters by specifying receiver ON times and durations

| Name | Type | Valid Range | Description |
|---|---|---|---|
| DeferPermit | Boolean | TRUE, FALSE | TRUE if the requested operation can be deferred until the next ranging round if the requested time has already passed. FALSE if the requested operation is only to be attempted in the current ranging round. |
| RxOnTimes | List of Integers | 0x000000-0xffffff | The number of RSTUs measured from the start of the first RSTU of the first slot of the ranging round before the receiver is to be enabled or disabled. This is a 24-bit value, and the precision of this value may be a minimum of 20 bits, with the lowest 4 bits being the least significant. |
| RxOnDurations | List of Integers | 0x000000-0xffffff | The number of RSTUs for which the receiver is to be enabled. If this parameter is equal to 0x000000, the receiver is to be disabled. |
| RangingRxControl | Enumeration | RANGING_OFF, RANGING_ON | Configure the transceiver to Rx with ranging for a value of RANGING_ON or to not enable ranging for RANGING_OFF. |

The MLME then determines whether the receiver can be enabled in the current ranging round. If the current time measured from the start of the ranging round is less than each of the (RxOnTimes), the MLME attempts to enable the receiver in the current ranging round. If the current time measured from the start of the ranging round is greater than or equal to one or more of the (RxOnTimes) and DeferPermit is equal to TRUE, the MLME defers until the next ranging round and attempts to enable the receiver in that ranging round. Otherwise, if the MLME cannot enable the receiver in the current ranging round and is not permitted to defer the receive enable operation until the next ranging round, the MLME issues the MLME-RX-ENABLE.confirm primitive with a status of PAST_TIME. If the RxOnDuration parameter is equal to zero, the MLME requests that the PHY disable a receiver.

In one example S2, MLME-RANGING-ROUND-RX-ENABLE.request via bitmap specification is provided.

The next higher layer can request that the receiver is either enabled for a finite period of time or disabled multiple times in a ranging round through a single primitive request using MLME-RANGING-ROUND-RX-ENABLE.request via bitmap specification. Each ranging round is made up of multiple ranging scheduling time units (RSTUs). The RxOnTimes bitmap with number of bits equal to the number of RSTUs in the ranging round, conveys whether the receiver may be enabled or disabled for the respective RSTUs. This does not preclude using other durations or nomenclatures for RSTUs (e.g., slot, frame, etc.) and for ranging round (e.g., superframe, beacon interval, etc.) It also does not preclude specifying the receiver enable or disable primitives using bitmap or similar discretized notations and/or indicators for any discretized intervals of time (including when the successive intervals of time are of unequal duration).

The semantics of this primitive are as follows:

```
MLME-RANGING-ROUND-RX-ENABLE.request (
    DeferPermit,
    RxOnTimes,
    RangingRxControl
).
```

The primitive parameters are defined in TALE 3.

TABLE 3

MLME-RX-ENABLE.request parameters via bitmap specification

| Name | Type | Valid Range | Description |
|---|---|---|---|
| DeferPermit | Boolean | TRUE, FALSE | TRUE if the requested operation can be deferred until the next ranging round if the requested time has already passed. FALSE if the requested operation is only to be attempted in the current ranging round. |
| RxOnTimes | Bitmap | varies | A bitmap with number of bits equal to the number of RSTUs per ranging round, where each bit $b_k$ indicates the status of the receiver during the $RSTU_k$ for each of the RSTUs of the ranging round. Each bitmap entry bk may be set to "1" to indicate the receiver ON for $RSTU_k$ and "0" for receiver OFF (or vice versa). |
| RangingRxControl | Enumeration | RANGING_OFF, RANGING_ON | Configure the transceiver to Rx with ranging for a value of RANGING_ON or to not enable ranging for RANGING_OFF. |

When RxOnTimes is conveyed through a bitmap with each bit indicates the receiver ON or OFF status per RSTU conveys the RxOnDurations information. However, specifying this is not precluded under this scheme.

In one embodiment, primitives for confirming the receiver enable time is provided.

In one example S3, MLME-RANGING-ROUND-RX-ENABLE.confirm via enumeration is provided.

The MLME-RANGING-ROUND-RX-ENABLE.confirm primitive reports the results of the attempt to enable or disable the receiver.

The semantics of this primitive are as follows:

```
MLME-RANGING-ROUND-RX-ENABLE.confirm (
    Status
).
```

The primitive parameters are defined in TABLE 4.

The MLME-RANGING-ROUND-RX-ENABLE.confirm primitive is generated by the MLME and issued to a next higher layer in response to an MLME-RANGING-ROUND-RX-ENABLE.request primitive. This primitive returns a Status of either SUCCESS, if the request to enable or disable the receiver was successful, or the appropriate error code for each of the enable and disable request in MLME-RANGING-ROUND-RX-ENABLE.request.

TABLE 4

MLME-RANGING-ROUND-RX-ENABLE.confirm parameter via enumeration

| Name | Type | Valid Range | Description |
|---|---|---|---|
| Status | List of Enumeration | SUCCESS, PAST_TIME, ON_TIME_TOO_LONG, INVALID_PARAMETER, RANGING_NOT_SUPPORTED | The result of the request to enable or disable the receiver. |

In one example S4, MLME-RANGING-ROUND-RX-ENABLE.confirm via bitmap is provided.

The MLME-RANGING-ROUND-RX-ENABLE.confirm primitive reports the results of the attempt to enable or disable the receiver.

The semantics of this primitive are as follows:

---
MLME-RANGING-ROUND-RX-ENABLE.confirm (
   Status
).

---

The primitive parameters are defined in TABLE 5.

The MLME-RANGING-ROUND-RX-ENABLE.confirm primitive is generated by the MLME and issued to a next higher layer in response to an MLME-RANGING-ROUND-RX-ENABLE.request primitive. This primitive returns a bitmap specifying whether the attempt to enable or disable the receiver in each RSTU was successful. The length of the bitmap (number of bits in the bitmap) corresponds to the number of RSTUs or the number of discretized time durations or intervals used to specify receiver enable or disable times. This does not preclude using other durations or nomenclatures for RSTUs (e.g., slot, frame, etc.) and for ranging round (e.g., superframe, beacon interval, etc.) It also does not preclude specifying the receiver enable or disable primitives using bitmap or similar discretized notations and/or indicators for any discretized intervals of time (including when the successive intervals of time are of unequal duration).

TABLE 5

MLME-RANGING-ROUND-RX-ENABLE.confirm parameter via bitmap

| Name | Type | Valid Range | Description |
|---|---|---|---|
| Status | Bitmap | varies | The result of the request to enable or disable the receiver. A bitmap with number of bits equal to the number of RSTUs per ranging round (or number of bits in the RxOnTimes bitmap of Scheme S2), where each bit $b_k$ indicates the result of the request to enable or disable the receiver during the $RSTU_k$ for each of the RSTUs of the ranging round. Each bitmap entry bk may be set to "1" to indicate the status as a success for $RSTU_k$ and "0" to indicate the status as not a success or invalid parameter, ranging not supported, etc. (or vice versa). |

In one embodiment, message sequence charts illustrating primitives for receiver enable request and confirm is provided.

Figure 15A:
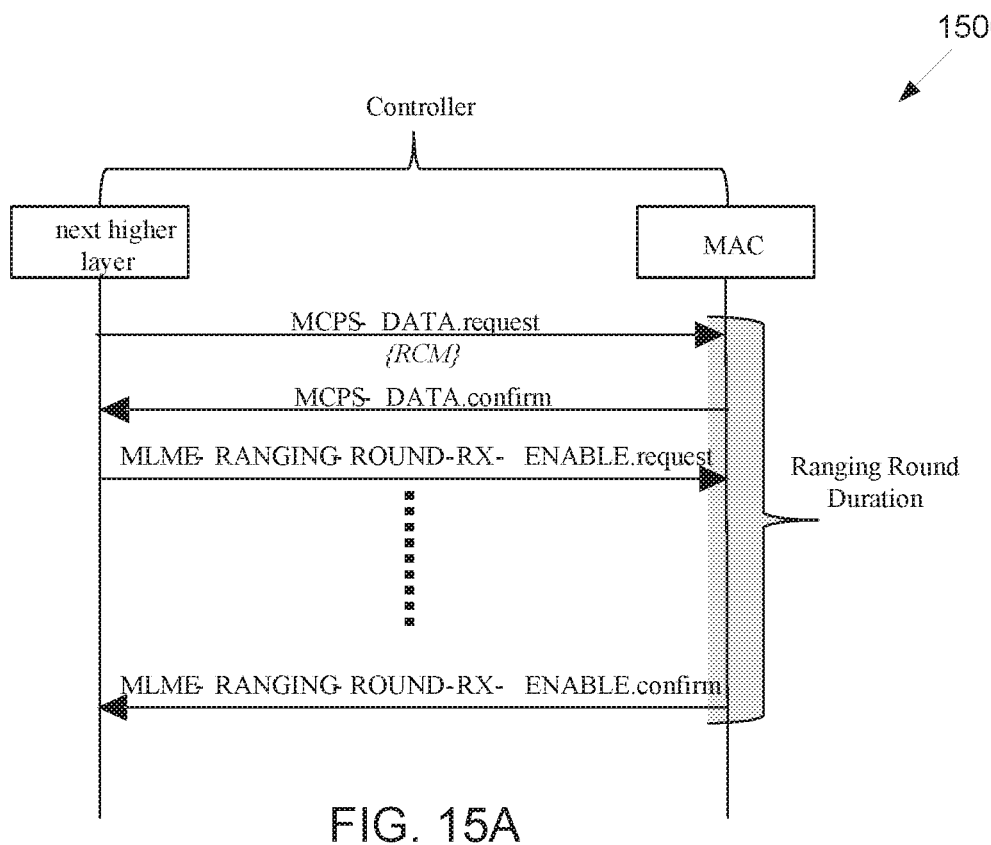
FIG. 15A illustrates an example MLME-RANGING-ROUND-RX-ENABLE.request and MLME-RANGING-ROUND-RX-ENABLE.confirm message sequence charts for controller according to embodiments of the present disclosure.
Figure 15B:
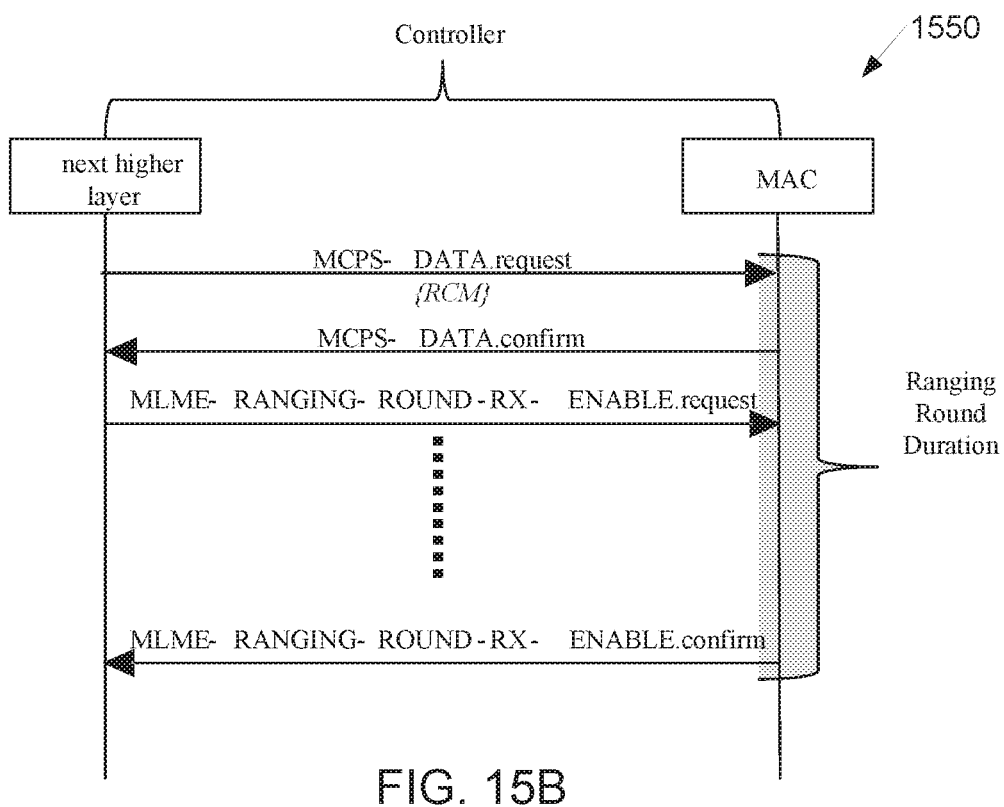
FIG. 15B illustrates an example MLME-RANGING-ROUND-RX-ENABLE.request and MLME-RANGING-ROUND-RX-ENABLE.confirm message sequence charts for controller according to embodiments of the present disclosure.
Figure 16:
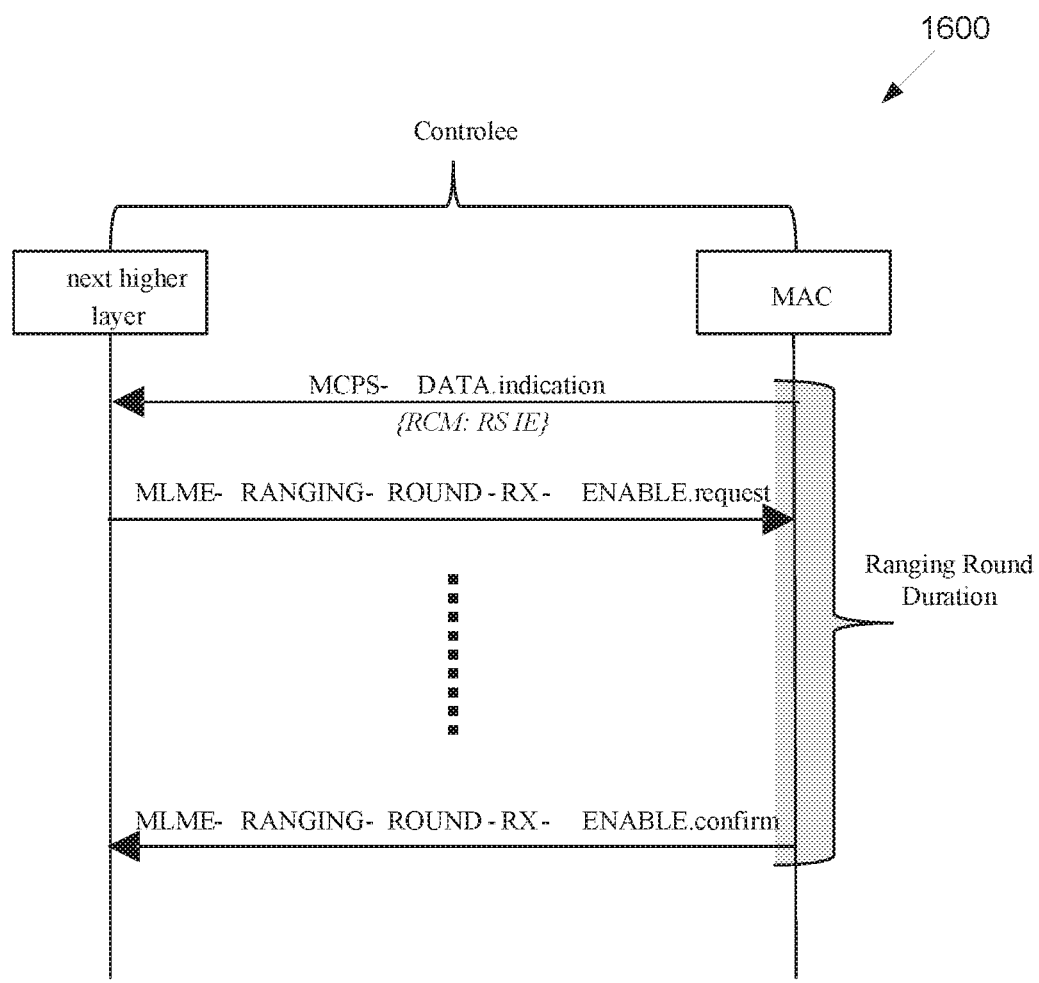
FIG. 16 illustrates an example MLME-RANGING-ROUND-RX-ENABLE.request and MLME-RANGING-ROUND-RX-ENABLE.confirm message sequence charts for controller according to embodiments of the present disclosure.

Example message charts for MLME-RANGING-ROUND-RX-ENABLE.request and MLME-RANGING-ROUND-RX-ENABLE.confirm for controller and controlee are shown in FIGS. 15A and 15B, and FIG. 16, respectively.

FIG. 15A illustrates an example MLME-RANGING-ROUND-RX-ENABLE.request and MLME-RANGING-ROUND-RX-ENABLE.confirm message sequence charts for controller 1500 according to embodiments of the present disclosure. The embodiment of the MLME-RANGING-ROUND-RX-ENABLE.request and MLME-RANGING-ROUND-RX-ENABLE.confirm message sequence charts for controller 1500 illustrated in FIG. 15A is for illustration only. FIG. 15A does not limit the scope of the present disclosure to any particular implementation. In one embodiment, the MLME-RANGING-ROUND-RX-ENABLE.request and MLME-RANGING-ROUND-RX-ENABLE.confirm message sequence charts for controller 1500 may be used by a controller, a controlee, an initiator, and/or responder as illustrated in FIG. 8. In one embodiment, the MLME-RANGING-ROUND-RX-ENABLE.request and MLME-RANGING-ROUND-RX-ENABLE.confirm message sequence charts for controller 1500 may be used by a network entity (e.g., BS 101-103 as illustrated in FIG. 1, terminal 111-116 as illustrated in FIG. 1).

FIG. 15B illustrates an example MLME-RANGING-ROUND-RX-ENABLE.request and MLME-RANGING-ROUND-RX-ENABLE.confirm message sequence charts for controller 1550 according to embodiments of the present disclosure. The embodiment of the MLME-RANGING-ROUND-RX-ENABLE.request and MLME-RANGING-ROUND-RX-ENABLE.confirm message sequence charts for controller 1550 illustrated in FIG. 15B is for illustration only. FIG. 15B does not limit the scope of the present disclosure to any particular implementation. In one embodiment, the MLME-RANGING-ROUND-RX-ENABLE.request and MLME-RANGING-ROUND-RX-ENABLE.confirm message sequence charts for controller 1550 may be used by a controller, a controlee, an initiator, and/or responder as illustrated in FIG. 8. In one embodiment, the MLME-RANGING-ROUND-RX-ENABLE.request and MLME-RANGING-ROUND-RX-ENABLE.confirm message sequence charts for controller 1550 may be used by a network entity (e.g., BS 101-103 as illustrated in FIG. 1, terminal 111-116 as illustrated in FIG. 1).

FIG. 16 illustrates an example MLME-RANGING-ROUND-RX-ENABLE.request and MLME-RANGING-ROUND-RX-ENABLE.confirm message sequence charts for controller 1600 according to embodiments of the present disclosure. The embodiment of the MLME-RANGING-ROUND-RX-ENABLE.request and MLME-RANGING-ROUND-RX-ENABLE.confirm message sequence charts for controller 1600 illustrated in FIG. 16 is for illustration only. FIG. 16 does not limit the scope of the present disclosure to any particular implementation. In one embodiment, the MLME-RANGING-ROUND-RX-ENABLE.request and MLME-RANGING-ROUND-RX-ENABLE.confirm message sequence charts for controller 1600 may be used by a controller, a controlee, an initiator, and/or responder as illustrated in FIG. 8. In one embodiment, the MLME-RANGING-ROUND-RX-ENABLE.request and MLME-RANGING-ROUND-RX-ENABLE.confirm message sequence charts for controller 1600 may be used by a network entity (e.g., BS 101-103 as illustrated in FIG. 1, terminal 111-116 as illustrated in FIG. 1).

In one embodiment, primitives for request the start of the ranging round is provided.

The next higher layer uses the MLME-RANGING-ROUND-START.request to indicate the timing of start of the ranging round. Since the time structure of ranging round is managed by the next higher layer, this primitive enables the indication and alignment of MAC timing structure.

The semantics of the primitive:

---
MLME-RANGING-ROUND-START.request (
   RangingRoundStart
).

---

MLME-RANGING-ROUND-START.request is generated by the next higher layer and issued to the MLME at the exact instant of the start of the ranging round to indicate the start of the ranging round and align the MAC timing structure. All the MAC timing counters and durations of the MLME-RANGING-ROUND-RX-ENABLE.request primitive are with respect to the MLME-RANGING-ROUND-START.request primitive.

TABLE 6

| MLME-RANGING-ROUND-RX-START.request parameter | | | |
|---|---|---|---|
| Name | Type | Valid Range | Description |
| RangingRoundStart | Constant | TRUE | MAC starts the new ranging round timing from the RSTU starting immediately after the reception of this primitive |

Figure 17A:
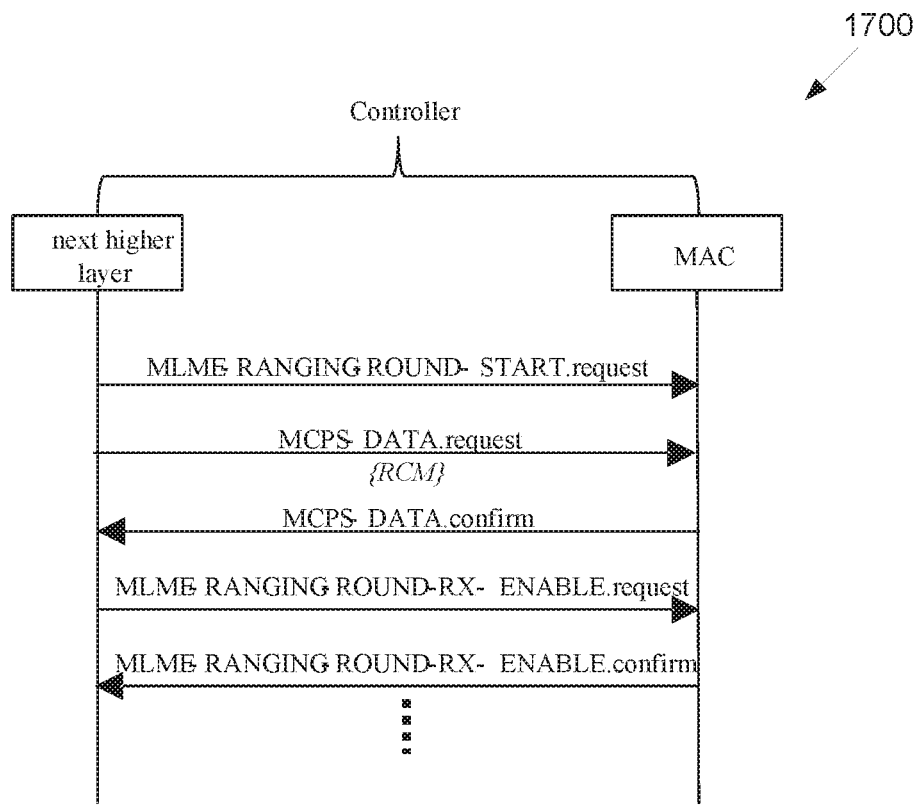
FIG. 17A illustrates an example MLME-RANGING-ROUND-START.request, MLME-RANGING-ROUND-RX-ENABLE.request and MLME-RANGING-ROUND-RX-ENABLE.confirm message sequence charts for controller according to embodiments of the present disclosure.

FIG. 17A illustrates an example MLME-RANGING-ROUND-START.request, MLME-RANGING-ROUND-RX-ENABLE.request and MLME-RANGING-ROUND-RX-ENABLE.confirm message sequence charts for controller 1700 according to embodiments of the present disclosure. The embodiment of the MLME-RANGING-ROUND-START.request, MLME-RANGING-ROUND-RX-ENABLE.request and MLME-RANGING-ROUND-RX-ENABLE.confirm message sequence charts for controller 1700 illustrated in FIG. 17A is for illustration only. FIG. 17A does not limit the scope of the present disclosure to any particular implementation. In one embodiment, the MLME-RANGING-ROUND-START.request, MLME-RANGING-ROUND-RX-ENABLE.request and MLME-RANGING-ROUND-RX-ENABLE.confirm message sequence charts for controller 1700 may be used by a controller, a controlee, an initiator, and/or responder as illustrated in FIG. 8. In one embodiment, the MLME-RANGING-ROUND-START.request, MLME-RANGING-ROUND-RX-ENABLE.request and MLME-RANGING-ROUND-RX-ENABLE.confirm message sequence charts for controller 1700 may be used by a network entity (e.g., BS 101-103 as illustrated in FIG. 1, terminal 111-116 as illustrated in FIG. 1).

Figure 17B:
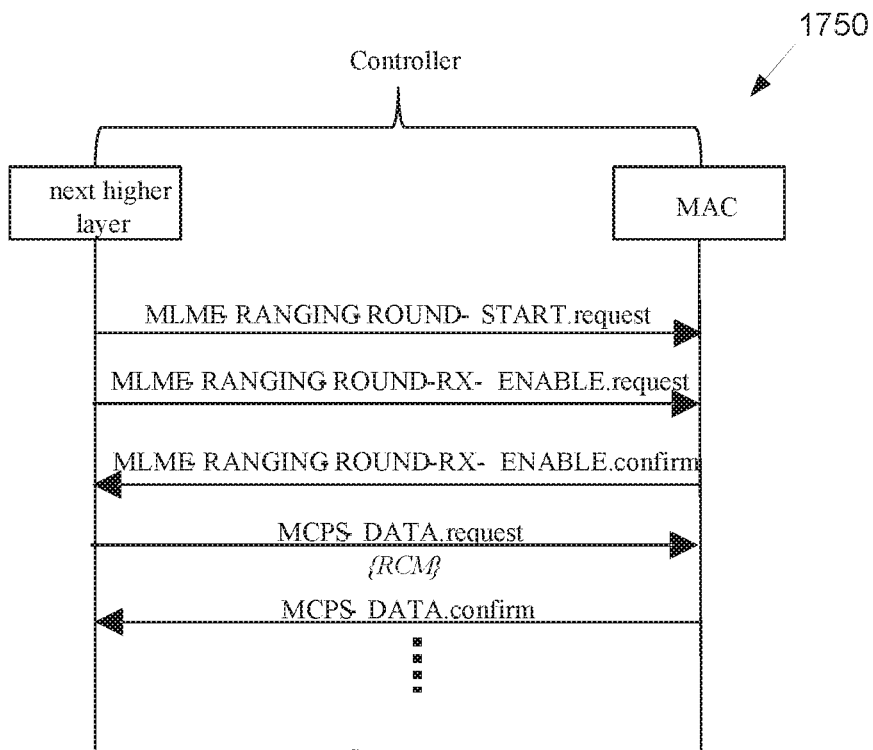
FIG. 17B illustrates an example MLME-RANGING-ROUND-START.request, MLME-RANGING-ROUND-RX-ENABLE.request and MLME-RANGING-ROUND-RX-ENABLE.confirm message sequence charts for controller according to embodiments of the present disclosure.

FIG. 17B illustrates an example MLME-RANGING-ROUND-START.request, MLME-RANGING-ROUND-RX-ENABLE.request and MLME-RANGING-ROUND-RX-ENABLE.confirm message sequence charts for controller 1750 according to embodiments of the present disclosure. The embodiment of MLME-RANGING-ROUND-START.request, MLME-RANGING-ROUND-RX-ENABLE.request and MLME-RANGING-ROUND-RX-ENABLE.confirm message sequence charts for controller 1750 illustrated in FIG. 17B is for illustration only. FIG. 17B does not limit the scope of the present disclosure to any particular implementation. In one embodiment, the MLME-RANGING-ROUND-START.request, MLME-RANGING-ROUND-RX-ENABLE.request and MLME-RANGING-ROUND-RX-ENABLE.confirm message sequence charts for controller 1750 may be used by a controller, a controlee, an initiator, and/or responder as illustrated in FIG. 8. In one embodiment, the MLME-RANGING-ROUND-START.request, MLME-RANGING-ROUND-RX-ENABLE.request and MLME-RANGING-ROUND-RX-ENABLE.confirm message sequence charts for controller 1750 may be used by a network entity (e.g., BS 101-103 as illustrated in FIG. 1, terminal 111-116 as illustrated in FIG. 1).

Figure 18:
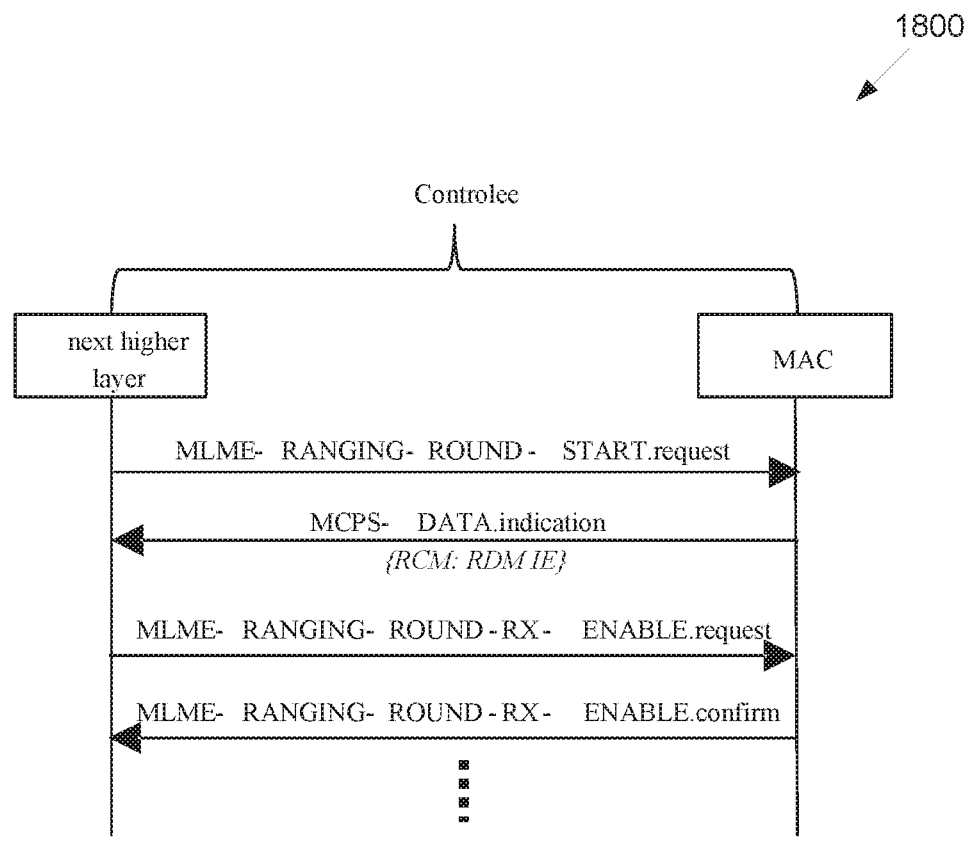
FIG. 18 illustrates an example MLME-RANGING-ROUND-START.request, MLME-RANGING-ROUND-RX-ENABLE.request and MLME-RANGING-ROUND-RX-ENABLE.confirm message sequence charts for controlee according to embodiments of the present disclosure.

FIG. 18 illustrates an example MLME-RANGING-ROUND-START.request, MLME-RANGING-ROUND-RX-ENABLE.request and MLME-RANGING-ROUND-RX-ENABLE.confirm message sequence charts for controlee 1800 according to embodiments of the present disclosure. The embodiment of the MLME-RANGING-ROUND-START.request, MLME-RANGING-ROUND-RX-ENABLE.request and MLME-RANGING-ROUND-RX-ENABLE.confirm message sequence charts for controlee 1800 illustrated in FIG. 18 is for illustration only. FIG. 18 does not limit the scope of the present disclosure to any particular implementation. In one embodiment, the MLME-RANGING-ROUND-START.request, MLME-RANGING-ROUND-RX-ENABLE.request and MLME-RANGING-ROUND-RX-ENABLE.confirm message sequence charts for controlee 1800 may be used by a controller, a controlee, an initiator, and/or responder as illustrated in FIG. 8. In one embodiment, the MLME-RANGING-ROUND-START.request, MLME-RANGING-ROUND-RX-ENABLE.request and MLME-RANGING-ROUND-RX-ENABLE.confirm message sequence charts for controlee 1800 may be used by a network entity (e.g., BS 101-103 as illustrated in FIG. 1, terminal 111-116 as illustrated in FIG. 1).

Example message charts for MLME-RANGING-ROUND-START.request, MLME-RANGING-ROUND-RX-ENABLE.request and MLME-RANGING-ROUND-RX-ENABLE.confirm for controller and controlee are shown in FIGS. 15A and 15B, and FIG. 16, respectively. MLME-RANGING-ROUND-START.request is sent by the next higher layer at the beginning of the ranging round for both controller and controlee. This indicates the beginning of the ranging round. For the controller, the MLME-RANGING-ROUND-RX-ENABLE.request is sent to the MAC by the next higher layer after the controller's next higher layer has set the configurations for the ranging round including the schedule for the ranging round. This can be either after the next higher layer conveys the RCM to the MAC as shown in FIG. 17A or may be before the controller conveys the RCM to the MAC as shown in FIG. 17B, either of which is decided by implementation choice. For the controlee, the MLME-RANGING-ROUND-RX-ENABLE.request is sent to the MAC by the next higher layer after the RCM and the schedule information (ARC IE and RDM IE) are received as shown in FIG. 18.

In one embodiment, a receiver Enabling time reference for enhanced ranging devices (ERDEVs) is provided.

The 802.15.4z standard specifies ERDEVs. Receiver enable, such as MLME-RX-ENABLE.request is a primitive conveyed by the next higher layer to the MAC of ERDEVs to enable the receiver. This primitive specifies the time and the duration for enabling the receiver. The time to enable is with respect to a reference. If the device is an ERDEV, and if the device is beacon enabled, the beacon is chosen as the time reference. If the device is an ERDEV and if the device is not beacon enabled, then the TimeStamp parameter of the MCPS-Data.indication primitive that conveys the value of the RSTU counter to the next higher layer is used as the reference to convey the receiver enable time and durations in terms of RSTUs. Further details as elaborated in other embodiments.

In one embodiment, primitives for Rx-Enable using Beacon or TimeStamp parameter is provided.

In one example S4, primitive using MLME-RX-ENABLE.request is provided.

In the case of non-Beacon enabled ERDEVs, the next higher layer may directly specify the RSTU counter value to specify the RxOnTime. When TxTimeSpecified parameter of MCPS-DATA.indication is set to RSTU_TIME, the next higher layer may use the TimeStamp parameter of the most recent RCM as a reference for the RSTU counter values to specify the RxOnTime. The next higher layer may use the TimeStamp parameter of MCPS-DATA.indication from any other message to maintain synchronization. When the RSTU counter value for RxOnTime is lesser than the current RSTU value, the RxOnTime may be interpreted as referring the RSTUs for the counter values following the wraparound when DeferPermit is TRUE.

For beacon enabled ERDEVs, when TxTimeSpecified parameter of MCPS-DATA.indication is set to RSTU_TIME, the next higher layer may use the TimeStamp parameter of the most recent beacon (enhanced beacon frame) as a reference for the RSTU counter values to specify the RxOnTime.

The semantics of this primitive are as follows:

MLME-RX-ENABLE.request (
DeferPermit,
RxOnTime,
RxOnDuration,
RangingRxControl
).

The primitive parameters are defined in TABLE 7.

TABLE 7

MLME-RX-ENABLE.request parameters for ERDEV

| Name | Type | Valid Range | Description |
| --- | --- | --- | --- |
| DeferPermit | Boolean | TRUE, FALSE | TRUE if the requested operation can be deferred to the next beacon interval for beacon enabled ERDEV or deferred after the wraparound of the RSTU counter for non-beacon enabled ERDEV. FALSE if the requested operation is only to be attempted only before the wraparound. |
| RxOnTime | Integer | 0x00000000-0xffffffff | The RSTU counter value at which the receiver is to be enabled or disabled. This is a 32-bit value |
| RxOnDuration | Integers | 0x00000000-0xffffffff | The number of RSTUs for which the receiver is to be enabled. If this parameter is equal to 0x00000000, the receiver is to be disabled. |
| RxAutoOff | Boolean | TRUE, FALSE | For ERDEV, when RxAutoOff is TRUE, the receiver is disabled immediately after the reception of a frame, otherwise the receiver remains enabled for the RxOnDuration even after the reception of a frame. |
| RangingRxControl | Enumeration | RANGING_OFF, RANGING_ON | Configure the transceiver to Rx with ranging for a value of RANGING_ON or to not enable ranging for RANGING_OFF. |

The next higher layer of ERDEVs may request that the receiver is either enabled for a finite duration or disabled, multiple times in a ranging round by through a single MLME-RX-ENABLE.request primitive. This is done by configuring the RxOnTime and RxOnDuration parameters as a list of integers as shown in TABLE 8 with other parameters as shown in TABLE 7.

TABLE 8

MLME-RX-ENABLE.request vector parameters for ERDEV

| Name | Type | Valid Range | Description |
| --- | --- | --- | --- |
| RxOnTime | List of Integers | 0x00000000-0xffffffff | The list of RSTU counter values at which the receiver is to be enabled or disabled. This is a 32-bit value |
| RxOnDuration | List of Integers | 0x00000000-0xffffffff | The number of RSTUs for which the receiver is to be enabled, corresponding to the RxOnTime. The length of this list may be equal to the length of RxOnTime list. If this parameter is equal to 0x00000000, the receiver is to be disabled. |
| RxAutoOff | List of Boolean | TRUE, FALSE | For ERDEV, when RxAutoOff is TRUE, the receiver is disabled immediately after the reception of a frame, otherwise the receiver remains enabled for the RxOnDuration even after the reception of a frame. The length of this list may be equal to the length of RxOnTime list. |

The MLME-RX-ENABLE.request primitive is generated by the next higher layer and issued to the MLME to enable the receiver for fixed durations, at times specified using the RSTU counter values. This primitive may also be generated to cancel a previously generated request to enable the receiver. The receiver is enabled based on the times in the unit of RSTU specified by the list of integers in RxOnTime and disabled after the corresponding duration chronologically specified by the list of integers in RxOnDuration. The length of the list of integers specified in RxOnTime and RxOnDuration may be the same.

The MLME may treat the request to enable or disable the receiver as secondary to other responsibilities of the device (e.g., GTSs, coordinator beacon tracking, or beacon transmissions). When the primitive is issued to enable the receiver, the device may enable a receiver until either the device has a conflicting responsibility, or the time specified by RxOnDuration has expired. In the case of a conflicting responsibility, the device may interrupt the receive operation. After the completion of the interrupting operation, the RxOnDuration may be checked to determine whether the time has expired. If so, the operation is complete. If not, the receiver is re-enabled until either the device has another conflicting responsibility, or the time specified by RxOnDuration has expired. When the primitive is issued to disable the receiver, the device may disable a receiver unless the device has a conflicting responsibility.

The MLME then determines whether the receiver can be enabled for the specified RSTU counters. If the current RSTU counter value is lower than the specified counter value for RxOnTime, the MLME attempts to enable the receiver in the current ranging round. If the current RSTU counter value is higher than the specified counter value for RxOnTime and DeferPermit is equal to TRUE, the MLME defers until the RSTU counter wraparound and attempts to enable the receiver in that ranging round. Otherwise, if the MLME cannot enable the receiver in the current ranging round and is not permitted to defer the receive enable operation until after the wraparound, the MLME issues the MLME-RX-ENABLE.confirm primitive with a Status of PAST_TIME.

If the RxOnDuration parameter is equal to zero, the MLME requests that the PHY disable a receiver.

In one embodiment, primitives for receive enable confirm with beacon or TimeStamp is provided.

In one example S5, MLME-RX-ENABLE.confirm is provided.

The MLME-RX-ENABLE.confirm primitive reports the results of the attempt to enable or disable the receiver.

The semantics of this primitive are as follows:

```
MLME-RX-ENABLE.confirm        (
                              Status
                              ).
```

The primitive parameters are defined in TABLE 9 and TABLE 10 for vector corresponding to MLME-RX-ENABLE.request vector parameters for ERDEV.

The MLME-RX-ENABLE.confirm primitive is generated by the MLME and issued to a next higher layer in response to an MLME-RX-ENABLE.request primitive. This primitive returns a Status of either SUCCESS, if the request to enable or disable the receiver was successful, or the appropriate error code, for each of the enable and disable request in MLME-RX-ENABLE.request.

TABLE 9

MLME-RX-ENABLE.confirm parameter for ERDEV

| Name | Type | Valid Range | Description |
| --- | --- | --- | --- |
| Status | Enumeration | SUCCESS, PAST_TIME, ON_TIME_TOO_LONG, INVALID_PARAMETER, RANGING_NOT_SUPPORTED | The result of the request to enable or disable the receiver. |

TABLE 10

MLME-RX-ENABLE.confirm vector parameter for ERDEV

| Name | Type | Valid Range | Description |
| --- | --- | --- | --- |
| Status | List of Enumeration | SUCCESS, PAST_TIME, ON_TIME_TOO_LONG, INVALID_PARAMETER, RANGING_NOT_SUPPORTED | The result of the request to enable or disable the receiver. |

In one embodiment, primitives for indicating non-receipt of a frame is provided.

In one example S6, MLME-RX-ENABLE.indication is provided.

The semantics of this primitive are as follows:

```
MLME-RX-ENABLE.indication     (
                              TimeStamp
                              ).
```

The MLME-RX-ENABLE.indication primitive for ERDEV reports a time-out if no frame was received for the duration specified by RxOnTime+RxOnDuration for each instance of RxOnTime.

TABLE 11

MLME-RX-ENABLE.indication parameter for ERDEV

| Name | Type | Valid Range | Description |
| --- | --- | --- | --- |
| TimeStamp | Integer | 0x00000000-0xffffffff | The TimeStamp parameter reports the current value of the RSTU counter along with the indication. |

Figure 19:
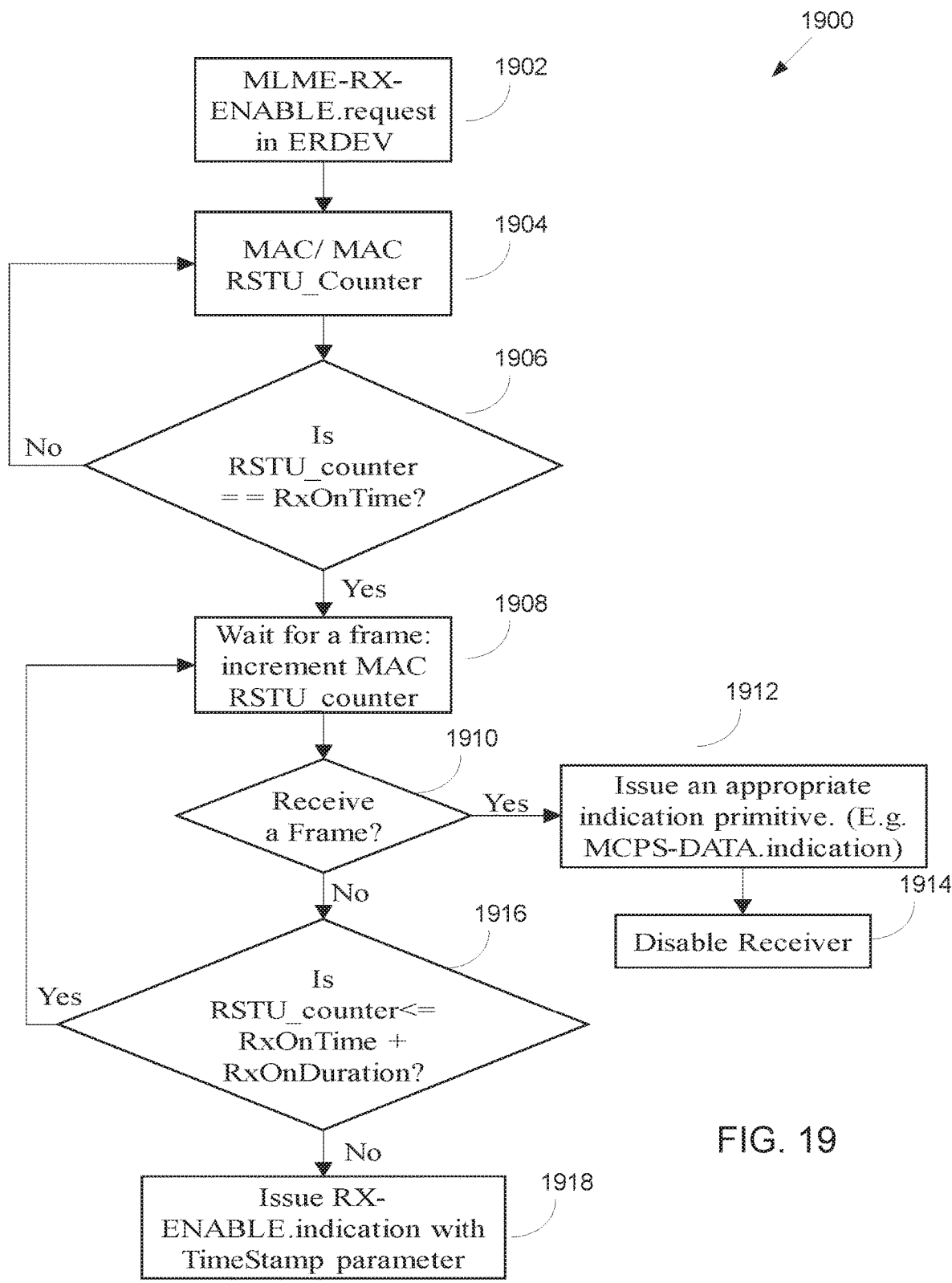
FIG. 19 illustrates a flowchart for MLME-RX-ENABLE.indication for ERDEV with RxAutoOff=TRUE according to embodiments of the present disclosure.

FIG. 19 illustrates a flowchart 1900 for MLME-RX-ENABLE.indication for ERDEV with RxAutoOff=TRUE according to embodiments of the present disclosure, as may be performed by a network entity. The embodiment of the flowchart 1900 illustrated in FIG. 19 is for illustration only. FIG. 19 does not limit the scope of the present disclosure to any particular implementation. In one embodiment, the flowchart 1900 may be used by a controller, a controlee, an initiator, and/or responder as illustrated in FIG. 8. In one embodiment, the flowchart 1900 may be performed by a network entity (e.g., BS 101-103 as illustrated in FIG. 1, terminal 111-116 as illustrated in FIG. 1).

As illustrated in FIG. 19, a network entity identifies MLME-RX-ENABLE.request in ERDEV in step 1902. In step 1904, the network entity identifies MAC/MAC RSTU_Counter. In step 1906, the network entity determines whether RSTU_counter==RxOn Time. In step 1906, if yes, the network entity in step 1908 waits for a frame and increase MAC RSTU_counter. In step 1906, if no, the network entity performs step 1904 again. In step 1910, the network entity determines whether a frame is received. In step 1910, if the frame is received, the network entity issues an appropriate indication primitive (e.g., MCPS-DATA.indication) and disables a receiver in step 1914. In step 1910, if the frame is not received, the network entity, in step 1916, determines whether RSTU_counter<=RxOnTime+RxOnDuration. In step 1916, if yes, the network entity performs step 1908 again. In step 1916, if no, the network entity in step 1918, issues RX-ENABLE.indication with TimeStamp parameters.

Figure 20:
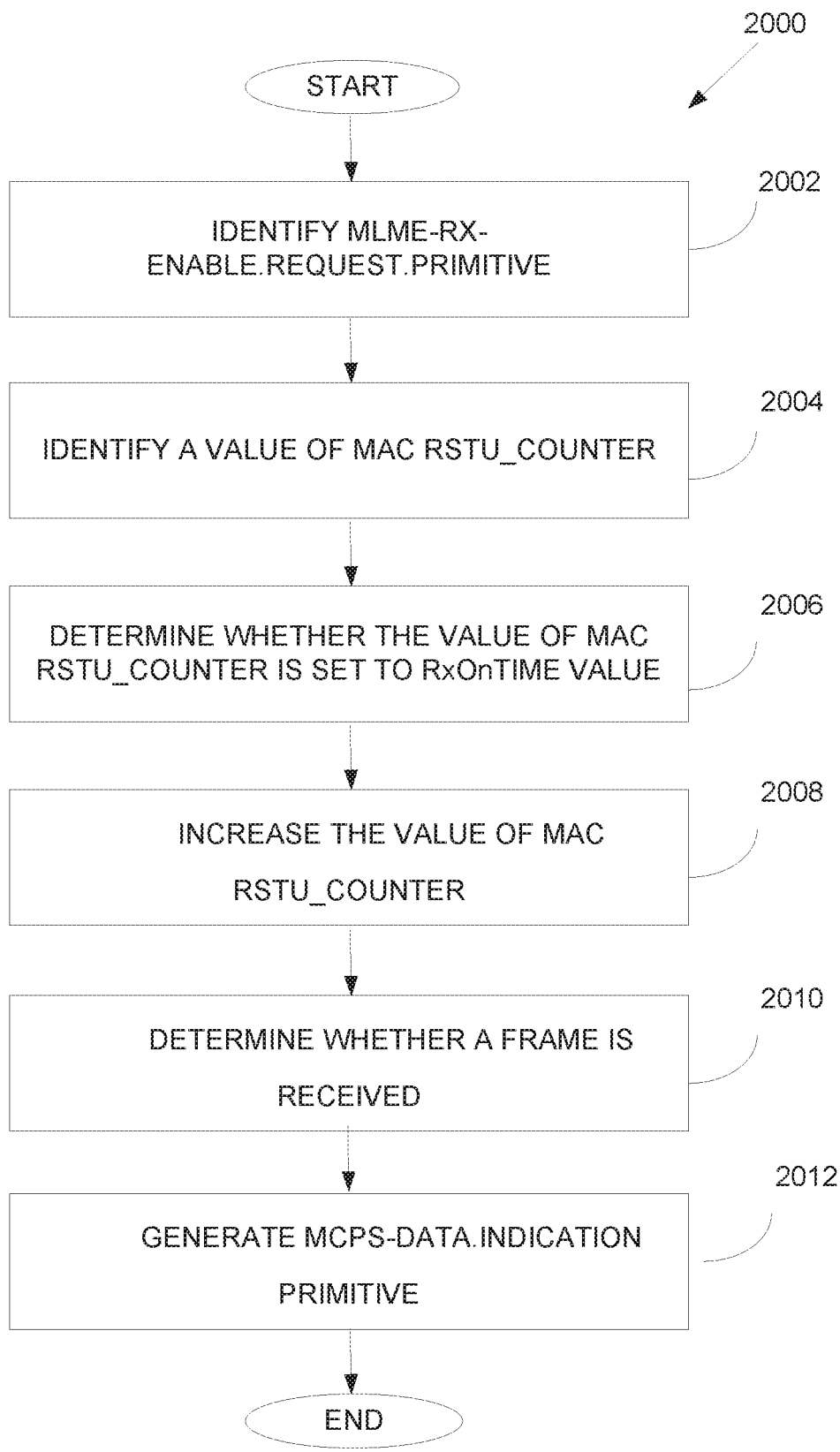
FIG. 20 illustrates a flowchart of a method for specifying receiver enable times according to embodiments of the present disclosure.

FIG. 20 illustrates a flowchart of a method 2000 for specifying receiver enable times according to embodiments of the present disclosure, as may be performed by a network entity. The embodiment of the method 2000 illustrated in FIG. 20 is for illustration only. FIG. 20 does not limit the scope of the present disclosure to any particular implementation. In one embodiment, the method 2000 may be performed by a controller, a controlee, an initiator, and/or responder as illustrated in FIG. 8. In one embodiment, the method 2000 may be used by a network entity (e.g., BS 101-103 as illustrated in FIG. 1, terminal 111-116 as illustrated in FIG. 1).

As illustrated in FIG. 20, the method 2000 begins at step 2002.

In step 2002, the network entity identifies a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer.

In one embodiment, in step 2002, the MLME-RX-ENABLE.indication primitive includes a time stamp (TimeStamp) parameter including a current value of the MAC RSTU_COUNTER and the MLME-RX-ENABLE.indication primitive is sent to the higher layer from the MAC layer.

In such embodiment, the current value of the MAC RSTU_COUNTER is determined based on the RxOnTime value and the RxOnDuration.

In such embodiment, the MLME-RX-ENABLE.request primitive further includes a receive auto-off (RxAutoOff) indicating a status of a transceiver that receives the frame.

In one embodiment, when the RxAutoOff is set to TRUE, the transceiver is disabled after receiving the frame; and when the RxAutoOff is set to FALSE, the transceiver remains enabled for the RxOnDuration.

In one embodiment, when the RxAutoOff is set to TRUE, the MCPS-DATA.indication primitive is sent to the higher layer from the MAC layer; and the MCPS-DATA.indication primitive includes an indication that a packet is received from the other network entity.

Subsequently, in step 2004, the network entity, in response to identifying the MLME-RX-ENABLE.request primitive, identifies a value of a MAC RSTU counter (MAC RSTU_COUNTER).

Subsequently, in step 2006, the network entity determines whether the value of the MAC RSTU_COUNTER is set to an RxOnTime value included in the list of the RxOnTime values of the MLME-RX-ENABLE.request primitive.

Subsequently, in step 2008, the network entity increases the value of the MAC RSTU_COUNTER.

Next, in step 2010, the network entity determines whether a frame is received from another network entity based on the value of the MAC RSTU_COUNTER.

Finally, in step 2012, the network entity, in response to determining that the frame is received, generates a MAC common part sublayer indication (MCPS-DATA.indication) primitive.

In one embodiment, the network entity disables a reception of the frame after generating the MCPS-DATA.indication primitive and the MCPS-DATA.indication primitive being sent to the higher layer from the MAC layer.

In one embodiment, the network entity, in response to determining that the frame is not received, determines whether the value of the MAC RSTU_COUNTER is less than or equal to a sum of the RxOnTime value and the RxOnDuration.

In one embodiment, the network entity generates a MLME-RX-ENABLE.indication primitive in response to determining that the value of the MAC RSTU_COUNTER is greater than the sum of the RxOnTime value and the RxOnDuration.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A network entity in a wireless communication system supporting ranging capability, the network entity comprising:
   a transceiver; and
   a processor operably connected to the transceiver, the processor configured to:
      identify a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer;
      in response to identifying the MLME-RX-ENABLE.request primitive, identify a value of a MAC RSTU counter (MAC RSTU_COUNTER);
      determine whether the value of the MAC RSTU_COUNTER is set to an RxOnTime value included in the list of the RxOnTime values of the MLME-RX-ENABLE.request primitive;
      increase the value of the MAC RSTU_COUNTER;
      determine whether the transceiver receives, from another network entity, a frame based on the value of the MAC RSTU_COUNTER; and
      in response to determining that the transceiver receives the frame, generate a MAC common part sublayer indication (MCPS-DATA.indication) primitive.

2. The network entity of claim 1, wherein the processor is further configured to disable the transceiver after generating the MCPS-DATA.indication primitive and the MCPS-DATA.indication primitive being sent to the higher layer from the MAC layer.

3. The network entity of claim 1, wherein the processor is further configured to:
   in response to determining that the transceiver did not receive the frame, determine whether the value of the MAC RSTU_COUNTER is less than or equal to a sum of the RxOnTime value and the RxOnDuration; and generate a MLME-RX-ENABLE.indication primitive in response to determining that the value of the MAC RSTU_COUNTER is greater than the sum of the RxOnTime value and the RxOnDuration.

4. The network entity of claim 3, wherein:
the MLME-RX-ENABLE.indication primitive includes a time stamp (TimeStamp) parameter including a current value of the MAC RSTU_COUNTER; and
the MLME-RX-ENABLE.indication primitive is sent to the higher layer from the MAC layer.

5. The network entity of claim 4, wherein the current value of the MAC RSTU_COUNTER is determined based on the RxOnTime value and the RxOnDuration.

6. The network entity of claim 1, wherein the MLME-RX-ENABLE.request primitive further includes a receive auto-off (RxAutoOff) indicating a status of the transceiver.

7. The network entity of claim 6, wherein:
when the RxAutoOff is set to TRUE, the transceiver is disabled after receiving the frame; and
when the RxAutoOff is set to FALSE, the transceiver remains enabled for the RxOnDuration.

8. The network entity of claim 7, wherein:
when the RxAutoOff is set to TRUE, the MCPS-DATA.indication primitive is sent to the higher layer from the MAC layer; and
the MCPS-DATA.indication primitive includes an indication that a packet is received from the other network entity.

9. A method of a network entity in a wireless communication system supporting ranging capability, the method comprising:
identifying a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer;
in response to identifying the MLME-RX-ENABLE.request primitive, identifying a value of a MAC RSTU counter (MAC RSTU_COUNTER);
determining whether the value of the MAC RSTU_COUNTER is set to an RxOnTime value included in the list of the RxOnTime values of the MLME-RX-ENABLE.request primitive;
increasing the value of the MAC RSTU_COUNTER;
determining whether a frame is received from another network entity based on the value of the MAC RSTU_COUNTER; and
in response to determining that the frame is received, generating a MAC common part sublayer indication (MCPS-DATA.indication) primitive.

10. The method of claim 9, further comprising disabling a reception of the frame after generating the MCPS-DATA.indication primitive and the MCPS-DATA.indication primitive being sent to the higher layer from the MAC layer.

11. The method of claim 9, further comprising:
in response to determining that the frame is not received, determining whether the value of the MAC RSTU_COUNTER is less than or equal to a sum of the RxOnTime value and the RxOnDuration; and
generating a MLME-RX-ENABLE.indication primitive in response to determining that the value of the MAC RSTU_COUNTER is greater than the sum of the RxOnTime value and the RxOnDuration.

12. The method of claim 11, wherein:
the MLME-RX-ENABLE.indication primitive includes a time stamp (TimeStamp) parameter including a current value of the MAC RSTU_COUNTER; and
the MLME-RX-ENABLE.indication primitive is sent to the higher layer from the MAC layer.

13. The method of claim 12, wherein the current value of the MAC RSTU_COUNTER is determined based on the RxOnTime value and the RxOnDuration.

14. The method of claim 9, wherein the MLME-RX-ENABLE.request primitive further includes a receive auto-off (RxAutoOff) indicating a status of a transceiver that receives the frame.

15. The method of claim 14, wherein:
when the RxAutoOff is set to TRUE, the transceiver is disabled after receiving the frame; and
when the RxAutoOff is set to FALSE, the transceiver remains enabled for the RxOnDuration.

16. The method of claim 15, wherein:
when the RxAutoOff is set to TRUE, the MCPS-DATA.indication primitive is sent to the higher layer from the MAC layer; and
the MCPS-DATA.indication primitive includes an indication that a packet is received from the other network entity.

17. A non-transitory computer-readable medium comprising program code, that when executed by at least one processor, causes a network entity to in a wireless communication system supporting ranging capability:
identify a medium access control (MAC) sublayer management entity-receive-enable request (MLME-RX-ENABLE.request) primitive including a list of ranging scheduling time unit (RSTU) counter (RxOnTime) values and a number of RSTUs (RxOnDuration), wherein the MLME-RX-ENABLE.request primitive is sent to a MAC layer from a higher layer;
in response to identifying the MLME-RX-ENABLE.request primitive, identify a value of a MAC RSTU counter (MAC RSTU_COUNTER);
determine whether the value of the MAC RSTU_COUNTER is set to an RxOnTime value included in the list of the RxOnTime values of the MLME-RX-ENABLE.request primitive;
increase the value of the MAC RSTU_COUNTER;
determine whether a transceiver receives, from another network entity, a frame based on the value of the MAC RSTU_COUNTER; and
in response to determining that the transceiver receives the frame, generate a MAC common part sublayer indication (MCPS-DATA.indication) primitive.

18. The computer-readable medium of claim 17, further comprising program code, that when executed by a processor, causes the network entity to disable a transceiver after generating the MCPS-DATA.indication primitive and the MCPS-DATA.indication primitive being sent to the higher layer from the MAC layer.

19. The computer-readable medium of claim 17, further comprising program code, that when executed by a processor, causes the network entity to:
in response to determining that the transceiver did not receive the frame, determine whether the value of the MAC RSTU_COUNTER is less than or equal to a sum of the RxOnTime value and the RxOnDuration; and
generate a MLME-RX-ENABLE.indication primitive in response to determining that the value of the MAC RSTU_COUNTER is greater than the sum of the RxOnTime value and the RxOnDuration.

20. The computer-readable medium of claim 17, wherein:
the MLME-RX-ENABLE.indication primitive includes a time stamp (TimeStamp) parameter including a current value of the MAC RSTU_COUNTER;
the MLME-RX-ENABLE.indication primitive is sent to the higher layer from the MAC layer;
the current value of the MAC RSTU_COUNTER is determined based on the RxOnTime value and the RxOnDuration;
the MLME-RX-ENABLE.request primitive further includes a receive auto-off (RxAutoOff) indicating a status of the transceiver;
when the RxAutoOff is set to TRUE, the transceiver is disabled after receiving the frame;
when the RxAutoOff is set to FALSE, the transceiver remains enabled for the RxOnDuration;
when the RxAutoOff is set to TRUE, the MCPS-DATA.indication primitive is sent to the higher layer from the MAC layer; and
the MCPS-DATA.indication primitive includes an indication that a packet is received from the other network entity.

\* \* \* \* \*